(12) United States Patent
Olausson et al.

(10) Patent No.: US 9,430,136 B2
(45) Date of Patent: Aug. 30, 2016

(54) WORK STATION IN A PROCESS CONTROL SYSTEM

(75) Inventors: Martin Olausson, Vasteras (SE); Bjorn Yttergren, Umea (SE); Daniel Fallman, Umea (SE)

(73) Assignee: ABB Research Ltd., Zurich (CH)

(*) Notice: Subject to any disclaimer, the term of this patent is extended or adjusted under 35 U.S.C. 154(b) by 1074 days.

(21) Appl. No.: 12/955,700

(22) Filed: Nov. 29, 2010

(65) Prior Publication Data

US 2011/0072383 A1    Mar. 24, 2011

Related U.S. Application Data

(63) Continuation of application No. PCT/EP2009/054660, filed on Apr. 20, 2009.

(60) Provisional application No. 61/056,293, filed on May 27, 2008.

(51) Int. Cl.
*G06F 3/048* (2013.01)
*G06F 3/0488* (2013.01)
(Continued)

(52) U.S. Cl.
CPC ......... *G06F 3/0488* (2013.01); *G06F 3/0481* (2013.01); *G06F 3/0486* (2013.01); *G06F 3/04817* (2013.01)

(58) Field of Classification Search
CPC .... G06F 9/4443; G06F 11/3664; G06F 8/34; G06F 8/38; G05B 2219/23258
USPC ....... 715/977, 837, 836, 763, 765, 772, 764, 715/851, 727
See application file for complete search history.

(56) References Cited

U.S. PATENT DOCUMENTS 5,598,524 A * 1/1997 Johnston, Jr. ......... G06F 3/0486
                                                   715/769
5,694,561 A * 12/1997 Malamud et al. ............ 715/805
(Continued)

FOREIGN PATENT DOCUMENTS

CN    1981301 A    6/2007
EP    1744290 A2 * 1/2007

OTHER PUBLICATIONS

Anonymous: "Animated icons" Research Disclosure, Mason Publications, Hampshire, GB, vol. 305, No. 35, 1 Sep. 1, 1989, XP007114148ISSN: 0374-4353.
(Continued)

*Primary Examiner* — Kieu Vu
*Assistant Examiner* — Joy M Weber
(74) *Attorney, Agent, or Firm* — Whitmyer IP Group LLC

(57) ABSTRACT

A method of providing a user with data relating to an element in a process on a workstation, includes: providing representations of a plurality of process elements on a display as graphical symbols; receiving media data from a media recording device, the media recording device being configured to send the media data to the process control system after recording media data and having a data obtaining unit for reading a tag on the element with an element identifier and for providing the element identifier to the process control system; presenting at least an existence of the media data via the display; receiving the element identifier with the media data; comparing the element identifier with element identifying data stored for each process element; identifying the element based on the comparison; and providing an indication of which graphical symbol corresponds to the element as the existence of the media data s resented.

42 Claims, 17 Drawing Sheets

(51) Int. Cl.
G06F 3/0481 (2013.01)
G06F 3/0486 (2013.01)

(56) References Cited

U.S. PATENT DOCUMENTS

| | | | |
|---|---|---|---|
| 5,754,178 A * | 5/1998 | Johnston, Jr. | G06F 9/4443 715/769 |
| 6,545,669 B1 | 4/2003 | Kinawi et al. | |
| 6,965,376 B2 | 11/2005 | Tani et al. | |
| 2003/0184587 A1* | 10/2003 | Ording | G06F 3/04817 715/769 |
| 2004/0002049 A1* | 1/2004 | Beavers et al. | 434/350 |
| 2004/0119757 A1 | 6/2004 | Corley et al. | |
| 2004/0268393 A1* | 12/2004 | Hunleth et al. | 725/44 |
| 2005/0257204 A1 | 11/2005 | Bryant et al. | |
| 2005/0275636 A1* | 12/2005 | Dehlin | G06F 3/011 345/173 |
| 2008/0028321 A1 | 1/2008 | Weksler et al. | |
| 2009/0106674 A1* | 4/2009 | Bray et al. | 715/762 |
| 2009/0125842 A1* | 5/2009 | Nakayama | 715/835 |

OTHER PUBLICATIONS

Anonymous: "Combining icons to display conceptual relation of composed objects" Research Disclosure, Mason Publications, Hampshire, GB, vol. 340, No. 8, Aug. 1, 1992,XP007117961 ISSN: 0374-4353.

Daniel Fallmann, Mike Kruzeniski, Mattias Andersson: "Designing for a collaborative industrial environment: the case of the ABB Powerwall" Proceedings of the 2005 Conference on Designing for User Experience, Nov. 3, 2005-Nov. 5, 2005 pp. 2-16, XP040040842 San Francisco, California ISBN: 1-59593-250-X.

"Dynamic, Scrollable, Area-Sensitive Container Icons" IBM Technical Disclosure Bulletin, IBM Corp. New York, US, vol. 35, No. 7, Dec. 1, 1992, pp. 474-475, XP000333104 ISSN: 0018-8689.

International Search Report and Written Opinion of the International Searching Authority; PCT/EP2009/054660; Dec. 3, 2009; 18 pages.

Rekimoto J: "Pick-And-Drop: A Direct Manipulation Technique for Multiple Computer Environments" Symposium on User Interface Software and Technology, XX, XX, Jan. 1, 1997, pp. 31-39, XP000856967.

"Views as Slides Which Present the Contents of Objects" IBM Technical Disclosure Bulletin, IBM Corp. New York, US, vol. 37, No. 2B, Feb. 1, 1994, p. 229/230, XP000433823 ISSN: 0018-8689.

Office Action—Republic of China Application No. 200980119506.1 Issued: May 5, 2014 5 pages.

* cited by examiner

INFORMAL MESSAGING
CREATE, MOVE AROUND, AND DELETE VIRTUAL MESSAGES WITH THE TOUCH OF YOUR FINGER

INFORMAL MESSAGING
CREATE, MOVE AROUND, AND DELETE VIRTUAL MESSAGES WITH THE TOUCH OF YOUR FINGER

INFORMAL MESSAGING
CREATE, MOVE AROUND, AND DELETE VIRTUAL MESSAGES WITH THE TOUCH OF YOUR FINGER

INFORMAL MESSAGING
CREATE, MOVE AROUND, AND DELETE VIRTUAL MESSAGES WITH THE TOUCH OF YOUR FINGER

OMNIPRESENT WHITEBOARD
SEMI-TRANSPARENT WHITEBOARD IS ALWAYS PRESENT FOR JOTTING DOWN QUICK SKETCHES, DIAGRAMS...

OMNIPRESENT WHITEBOARD
SEMI-TRANSPARENT WHITEBOARD IS ALWAYS PRESENT FOR JOTTING DOWN QUICK SKETCHES, DIAGRAMS...

OMNIPRESENT WHITEBOARD
SEMI-TRANSPARENT WHITEBOARD IS ALWAYS PRESENT FOR JOTTING DOWN QUICK SKETCHES, DIAGRAMS...

ZOOM FREELY
SYSTEM ALLOWS ZOOMING IN AND OUT WITHOUT PREDEFINED STEPS OR REDUCED FUNCTIONS

ZOOM FREELY
SYSTEM ALLOWS ZOOMING IN AND OUT WITHOUT PREDEFINED STEPS OR REDUCED FUNCTIONALITY

GESTURE BASED NAVIGATION
MOVE AROUND IN THE PROCESS VIEW BY APPLYING GESTURES DIRECTLY ON THE SCREEN

SEAMLESS INTEGRATION WITH MOBILE PHONE
USERS CAN QUICKLY MOVE FACEPLATES DIRECTLY FROM THE SCREEN ON TO THEIR MOBILE PHONES

SEAMLESS INTEGRATION WITH MOBILE PHONE
USERS CAN QUICKLY MOVE FACEPLATES DIRECTLY FROM THE SCREEN AND TO THEIR MOBILE PHONES

SEAMLESS INTEGRATION WITH MOBILE PHONE
USERS CAN QUICKLY MOVE FACEPLATES DIRECTLY FROM THE SCREEN AND TO THEIR MOBILE PHONES

AUDIO MONITORING
USE THE MICROPHONE OBJECT TO HEAR LIVE SOUND OF CORRESPONDING PHYSICAL OBJECTS

AUDIO MONITORING
USE THE MICROPHONE OBJECT TO HEAR LIVE SOUND OF CORRESPONDING PHYSICAL OBJECTS

SEAMLESS INTEGRATION WITH DIGITAL CAMERAS
DIGITAL PHOTOS TAKEN IN THE FACTORY ENVIRONMENT SEAMLESSLY APPEAR ON THE COLLABORATIVE...

SEAMLESS INTEGRATION WITH DIGITAL CAMERAS
DIGITAL PHOTOS TAKEN IN THE FACTORY ENVIRONMENT SEAMLESSLY APPEAR ON THE COLLAB...

WORK STATION IN A PROCESS CONTROL SYSTEM

CROSS-REFERENCE TO RELATED APPLICATIONS

The present application is a continuation of pending International patent application PCT/EP2009/054660 filed on Apr. 20, 2009 which designates the United States and claims priority from U.S. provisional patent application No. 61/056,293 filed on May 27, 2008. The content of all prior applications is incorporated herein by reference.

FIELD OF THE INVENTION

This invention relates to a computerized process control system, such as an object based computerized system for controlling a process or part of a process.

SUMMARY OF THE INVENTION

The invention relates to a work station in a process control system that includes a user input unit, a display and a control unit. It may also include a storage in the form of a memory for storing data in relation to the activities performed by the control unit. The control unit may be a processor with an associated program memory including program code for performing the functionality, which will be described later on. The user input unit is a unit through which a user of the work station may enter data. As such it may be a keyboard, a keypad or a mouse. In a preferred embodiment of the present invention, the user input unit is combined with the display and thus together form a touch screen. There is thus in this case a combined display and user input unit. The work station may also include other user interfaces such as a speaker or a microphone in order to present and receive data to and from one or more users of the work station in other ways than through the display. A work station in a process control system is only one example of a computer in which the present invention may be realized.

Objects of the invention are achieved by providing a method of providing a user with data relating to an element in a process being presented on a workstation display of a process control system, comprising the steps of: providing a representation of a number of process elements on the display as manipulable graphical symbols, receiving media data that has been recorded by a media recording device, where said media recording device is not associated with any element but with the work station or the system and is configured to send media data to the process control system directly after it has been recorded, said media recording device being provided with an element determination data obtaining unit for reading a tag on the element with an element identifier of said element and providing the element identifier to the system when the media is recorded, and presenting at least the existence of the media data for the user via the display, receiving said element identifier together with said media data, comparing the element identifier with corresponding element identifying data stored for the various elements of the system, identifying a system element based on the comparison and providing an indication of which presented graphical symbol corresponds to the identified element as the existence of the media is presented.

For the method, the existence of the media may be presented through providing a representation of it in the form of a manipulable graphical symbol where the representations of the elements are combined folders and graphical symbols and further comprising the step of detecting a user placing the graphical symbol associated with the media on the graphical symbol representing one element, inserting said symbol associated with said media in the folder, and changing the appearance of the graphical symbol for the element in order to reflect that it includes said symbol associated with the media.

Other objects of the invention are achieved by providing a work station in a process control system including a display, a user input unit and a control unit, said control unit being arranged to provide a representation of a number of process elements on the display as manipulable graphical symbols, receive media data that has been recorded by a media recording device, where said media recording device is not associated with any element but with the work station or the system and is configured to send media data to the process control system directly after it has been recorded, said media recording device being provided with an element determination data obtaining unit for reading a tag on the element with an element identifier of said element and provide the element identifier to the system when the media is recorded, present at least the existence of the media data for the user via the display, receive said element identifier together with said media data, compare the element identifier with corresponding element identifying data stored for the various elements of the system, identify a system element based on the comparison, and provide an indication of which presented graphical symbol corresponds to the identified element as the existence of the media is presented.

For the work station, the existence of the media is presented through the control unit providing a representation of it in the form of a manipulable graphical symbol where the representations of the elements are combined folders and graphical symbols and the control unit is further arranged to detect a user placing the graphical symbol associated with the media on the graphical symbol representing one element, insert said symbol associated with said media in the folder, and change the appearance of the graphical symbol for the element in order to reflect that it includes said symbol associated with the media.

The workstation may further comprise a storage for storing data relating to at least some of the activities performed.

Other objects of the invention are achieved by providing a computer program product on a data carrier comprising computer program code configured to, when said program code is loaded into a workstation provided in a process control system, provide a representation of a number of process elements on the display as manipulable graphical symbols, receive media data that has been recorded by a media recording device, where said media recording device is not associated with any element but with the work station or the system and is configured to send media data to the process control system directly after it has been recorded, said media recording device being provided with an element determination data obtaining unit for reading a tag on the element with an element identifier of said element and provide the element identifier to the system when the media is recorded, present at least the existence of the media data for the user via the display, receive said element identifier together with said media data, compare the element identifier with corresponding element identifying data stored for the various elements of the system, identify a system element based on the comparison, and provide an indication of which presented graphical symbol corresponds to the identified element as the existence of the media is presented.

Other objects of the invention are achieved by providing a method of providing a user with data relating to the functioning of an element in a process being presented on a workstation display of a process control system, comprising the steps of: providing a representation of said element on the display as a manipulable graphical symbol, detecting a user selecting the graphical symbol representing the element, providing a user reserved area on the display, and if detecting that said graphical symbol is being moved to the user reserved area, continuously transmitting or ordering a device in the process control system to continuously transmit data relating to the functioning of the element in the process to a portable wireless communication device associated with said user for being presented on this device.

The method may further comprise the step of receiving said data from the element or a device relating to the control of the element in the process. The method may further comprise the step of receiving data enabling identification of the user and selecting user device based on a setting of user devices provided in a user setting store. The user indication enabling data may be received through the user logging onto the work station or wirelessly from an identification device carried by the user.

Other objects of the invention are achieved by providing a work station in a process control system for providing a user with data relating to the functioning of an element in a process and including a display, a user input unit and a control unit arranged to provide a representation of said element on the display as a manipulable graphical symbol, detect a user selecting the graphical symbol representing the element, provide a user reserved area on the display, and if detecting that said graphical symbol is being moved to the user reserved area, continuously transmit or order a device in the process control system to continuously transmit data relating to the functioning of the element in the process to a portable wireless communication device associated with said user for being presented on this device.

The work station may have the control unit further arranged to receive said data from the element or a device relating to the control of the element in the process. The work station may have the control unit further arranged to receive data enabling identification of the user and selecting user device based on a setting of user devices provided in a user setting store. The work station may have the user indication enabling data be received through the user logging onto the work station or wirelessly from an identification device carried by the user.

Other objects of the invention are achieved by providing a computer program product on a data carrier comprising computer program code configured to, when said program code is loaded into a workstation provided in a process control system, provide a representation of said element on the display as a manipulable graphical symbol, detect a user selecting the graphical symbol representing the element, provide a user reserved area on the display, and if detecting that said graphical symbol is being moved to the user reserved area, continuously transmit or order a device in the process control system to continuously transmit data relating to the functioning of the element in the process to a portable wireless communication device associated with said user for being presented on this device.

Other objects of the invention are achieved by providing a method for enabling a user to collect data relating to an element in a process being presented on a workstation display of a process control system, comprising the steps of: providing a representation of said element on the display as a manipulable graphical symbol combined with acting as a folder, receiving data regarding the element in the process, displaying said received data on the corresponding graphical symbol, detecting a user placing another object presented on the display on the graphical symbol representing the element, inserting said other object in the folder, and changing the appearance of the graphical symbol in order to reflect that it includes said object.

The method may further comprise the steps of detecting a first pointing by the user to a part of the graphical symbol the appearance of which has been changed and displaying the objects in the folder on the display based on this detection. The method may further comprise the step of detecting a second pointing by the user to a part of the graphical symbol the appearance of which has been changed and stopping displaying the objects in the folder based on this detection.

Other objects of the invention are achieved by providing a work station in a process control system including a display, a user input unit and a control unit, said control unit being arranged to provide a representation of said element on the display as a manipulable graphical symbol combined with acting as a folder, receive data regarding the element in the process, display said received data on the corresponding graphical symbol, detect a user placing another object presented on the display on the graphical symbol representing the element, insert said other object in the folder, and change the appearance of the graphical symbol in order to reflect that it includes said object.

The work station may be further arranged to detect a first pointing by the user to a part of the graphical symbol the appearance of which has been changed and display the objects in the folder on the display based on this detection. The work station may have the control unit further arranged to detect a second pointing by the user to a part of the graphical symbol the appearance of which has been changed and stop displaying the objects in the folder based on this detection.

Other objects of the invention are achieved by providing a computer program product on a data carrier comprising computer program code configured to, when said program code is loaded into a workstation provided in process control system, provide a representation of said element on the display as a manipulable graphical symbol combined with acting as a folder, receive data regarding the element in the process, display said received data on the corresponding graphical symbol, detect a user placing another object presented on the display on the graphical symbol representing the element, insert said other object in the folder, and change the appearance of the graphical symbol in order to reflect that it includes said object.

Other objects of the invention are achieved by providing a method of enabling a user to provide additional data in relation to manipulable symbols of elements in a process control system being presented on a workstation display, comprising the steps of: receiving a user selection to enter additional data in relation to said element symbols, providing, as a response to said user selection, a user input area on the display where the user can enter data, which user input area covers one or more element symbols, registering user inputs in the user input area and disabling manipulations of element symbols provided underneath said area, displaying the user inputs in the user input area, detecting said user being finished entering data, and deactivating said user input area in response to said detecting of the user being finished.

The method may have the user input area be semi-transparent when provided in order to allow element symbols to be viewed simultaneously. The method may have the step of registering user inputs comprise registering more than one simultaneous user input and the step of displaying user inputs comprises displaying said more than one simultaneous user input simultaneously on the display. The method may have the user input area when activated cover the whole of the display. The method may have the user input area when deactivated be removed from the display.

The method may have the user input area, when deactivated, be presented as a manipulable user area symbol on which the entered user data is displayed. The method may further comprise the step of detecting a manipulation of the deactivated user area symbol, which manipulation involves a rapid movement of said symbol from one position to another, and removing said symbol from the display in response to such a movement. The method may further comprise the steps of starting a timer when detecting the user being finished entering data and removing said user area symbol when the timer has reached a predetermined value.

Other objects of the invention are achieved by providing a method of enabling a user to navigate between sections of a screen area, which screen area includes a number of graphical manipulable symbols provided in the various sections, where at least some of these graphical symbols are symbols of elements in a process control system being presented on a workstation display, and comprising the steps of: displaying a first single section on the workstation display, detecting a user selection of a single section to be displayed on the screen area, and displaying said single user selected section on the display.

The method may further comprise the steps of receiving a user selection of a zooming action, performing a zooming action through zooming out of the first section for displaying more sections on the display based on the zooming action selection and detecting a user selection of a return to displaying a single section, wherein the step of detecting a user selection of a single section involves detecting the user manipulating at least one object in one of the sections displayed on the display after the having zoomed out of the first section the step of displaying a single user selected section is performed after detecting a user selection of a return to displaying a single section.

The method may have the zooming action involve a continuous zooming action. The method may further comprise the step of displaying a set of fields on the display, where each field represents one of the sections, the step of detecting a user selection involves detecting the user selecting one of the fields and the step of displaying the user selected section comprises displaying the section corresponding to the field selected by the user.

Other objects of the present invention are achieved by providing a method for enabling a user to navigate on a screen area, which screen area includes a number of graphical manipulable symbols, where at least some of these graphical symbols are symbols of elements in a process control system being displayed on a workstation display and where the screen area is larger than the area covered by the display, comprising the steps of: displaying a part of the screen area, detecting a gesture performed by the user on the display, and changing the part of the screen area displayed based on the detected gesture.

The method may have the gesture involve a dragging motion in one direction on the display and the step of changing the part of the screen area displayed involves moving to a part of the screen area located in the direction of the dragging motion and displaying this part.

Other objects of the present invention are achieved by providing a method of providing a user with data relating to an element in a process being presented on a workstation display of a process control system, comprising the steps of: providing a representation of said element on the display as a first graphical symbol, providing a second graphical symbol associated with a certain data type, detecting a user selecting and moving the second graphical symbol to the first graphical symbol, fetching data of the data type associated with the element represented by the second graphical symbol, and presenting said data for the user.

The method may have the data type be media data in the group of sound, image and video relating to the element. The method may have the data be statistical data, for instance presented in the form of a curve. The method may have the data be a circuit diagram of the element.

Other objects of the invention are achieved by providing a workstation in a process control system including a display, a user input unit and a control unit arranged to perform the steps of any of previous method claims.

The workstation may further comprise a storage for storing data relating to at least some of the activities performed.

Other objects of the invention are achieved by providing a computer program product on a data carrier comprising computer program code configured to perform the steps of any of previous method claims, when said program code is loaded into a workstation provided in process control system.

Other objects of the invention and its particular features and advantages will become more apparent from consideration of the following drawings and accompanying detailed description. It should be understood that the detailed description and specific examples, while indicating the preferred embodiment of the invention, are intended for purposes of illustration only and are not intended to limit the scope of the invention

DETAILED DESCRIPTION OF THE INVENTION

Figure 1:
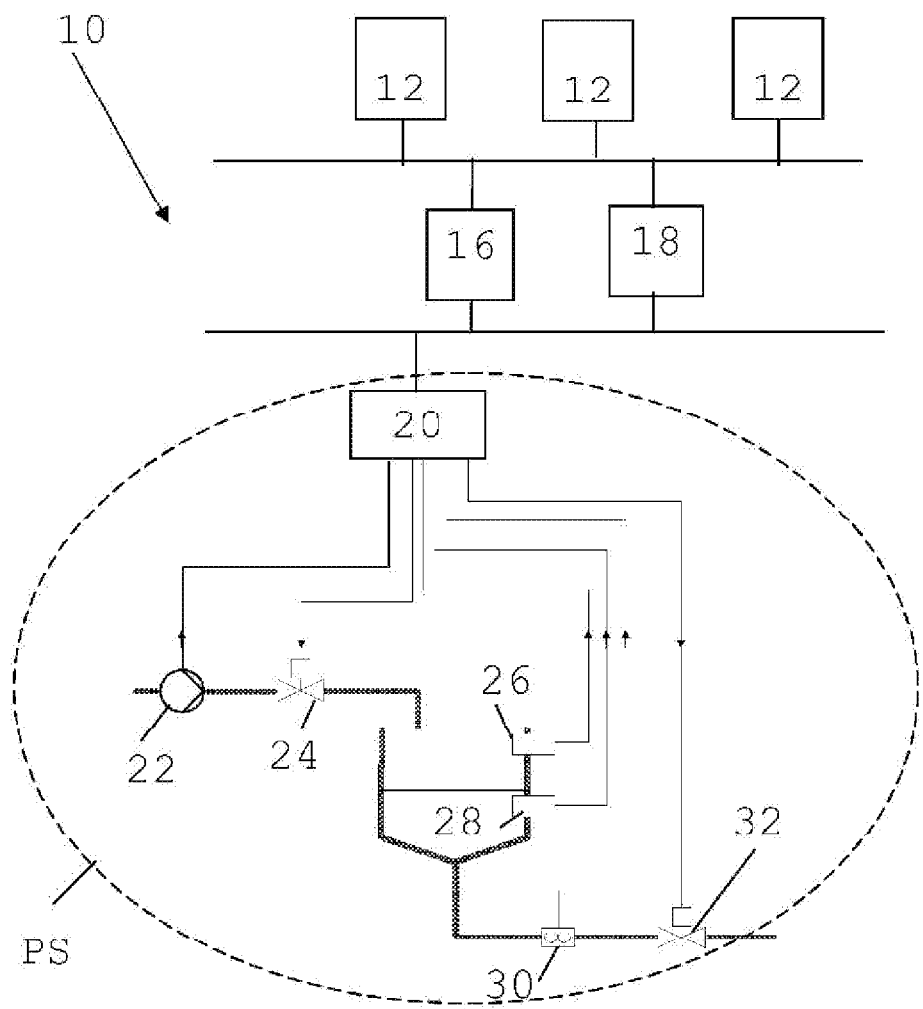
FIG. 1 is a schematic of a computerized process of an embodiment of the present invention.

The work station is provided in a process control system shown in FIG. 1.

FIG. 1 schematically shows a computerized process control system 10. The system 10 is typically an object based computerized system for controlling a process or perhaps part of a process. Typical processes are electrical power generation, transmission and supply process, water purification and distribution processes, oil and gas production and distribution processes, petrochemical, chemical, pharmaceutical and food processes, and pulp and paper production processes. These are just some examples of processes where the system can be applied. There exist countless other processes. Normally there may in such a system be one or more controllers having some local software for controlling one or more field devices. The field devices may be different entities that influence or measure different properties of the technical process, like such things as a pump, a motor, a valve, etc. A process, or a part of a process, may be controlled via a server, which then typically communicates with a controller for providing control of a process. The process may be monitored through an operator terminal, which communicates with the server.

In FIG. 1 the system 10 therefore includes a number of operator and engineering terminals 12 connected to a first bus. There is furthermore a second bus and between the first and second busses there are connected a first server 16 comprising computer objects providing control of the process and a second server 18 providing an application controlling the process through invoking objects in the first server 16. To the second bus there is furthermore connected a controller 20 (Process Controller or Programmable Logic Controller PLC) for providing control in the system 10. In the figure there is only provided one controller 20. It should however be realized that there may be several more controllers in the system 10. The controller 20 is then connected to one or more field devices. As an example the controller 20 is shown as being connected to a process section PS, which process section includes a first inlet pipe leading to a tank and a second outlet pipe leaving the tank. In the first pipe there is provided a pump 22 that pumps fluid into the first pipe as well as a first valve 24. In the tank there are provided two level sensors 26 and 28 and in the outlet pipe there is provided a flow meter 30 and a second valve 32. All these elements are field devices. Said controller 20 receives control input values from the pump 22 and level sensors 26 and 28 and regulates the fluid level in the tank based on these control input values through controlling the first valve 24. It also receives control input values from the flow meter 30 and controls the second valve 32 for regulating the output fluid flow. These entities are thus examples of field devices.

The field devices are here elements of the system and the operator terminals are work stations as described above.

On the work stations there are shown manipulable graphical symbols of the elements, which may also be called face plates, icons, objects and graphical elements. Theses graphical symbols representing system elements are furthermore with advantage shown as being interconnected in a control structure used for controlling the process. On the display there may also be shown other graphical symbols representing other functions or elements, such as representing media data, like images, zooming and navigation symbols as well as data type symbols. These other graphical symbols are also in many cases manipulable.

Figure 2:
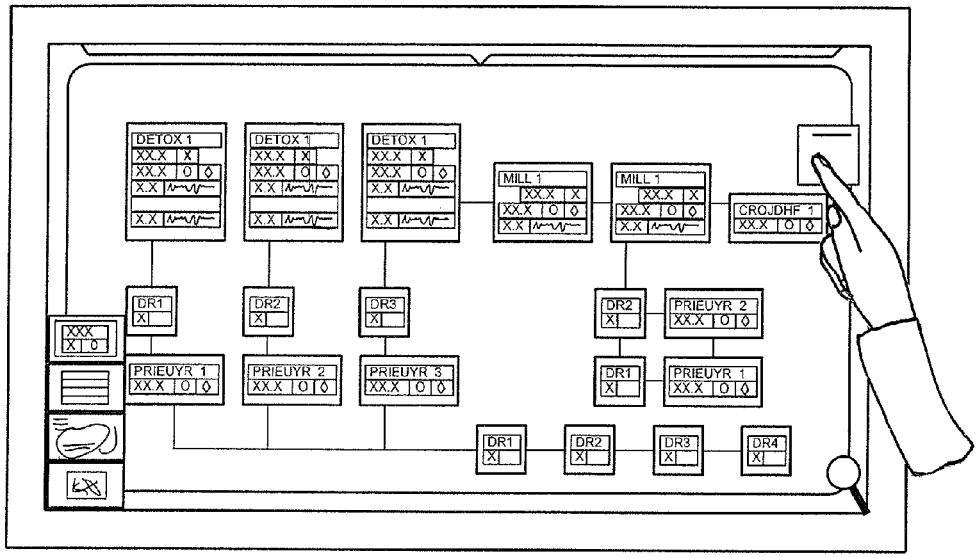
FIGS. 2-32 are show a user operating the workstation of an embodiment of the present invention.
Figure 3:
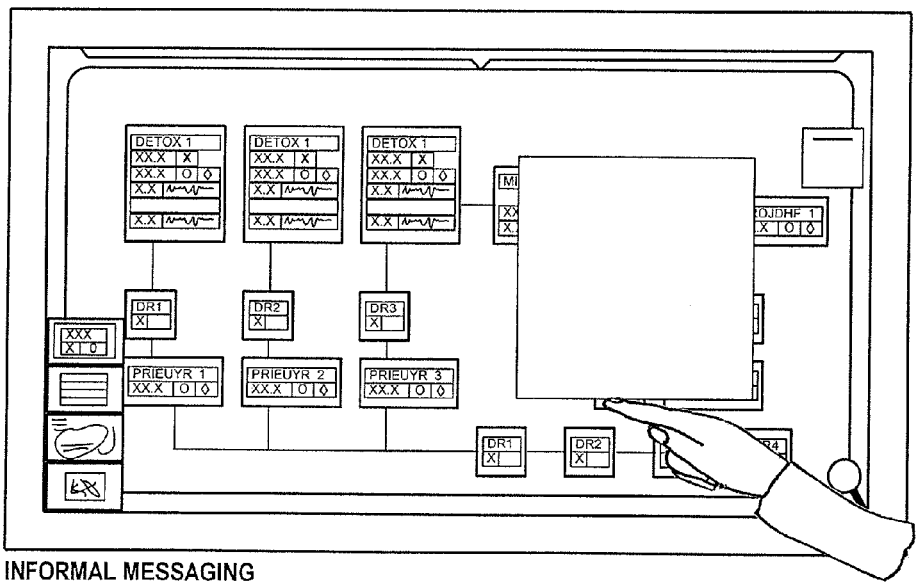
Figure 4:
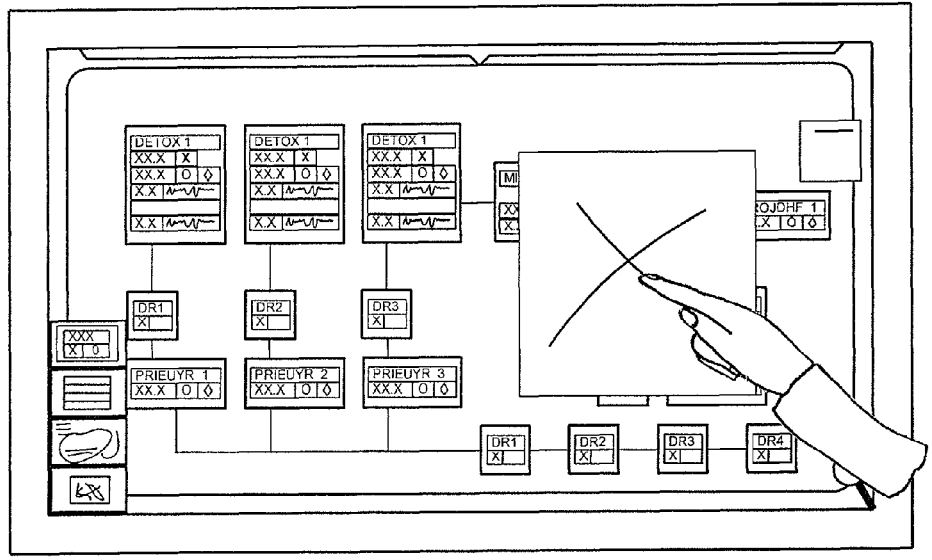
Figure 5:
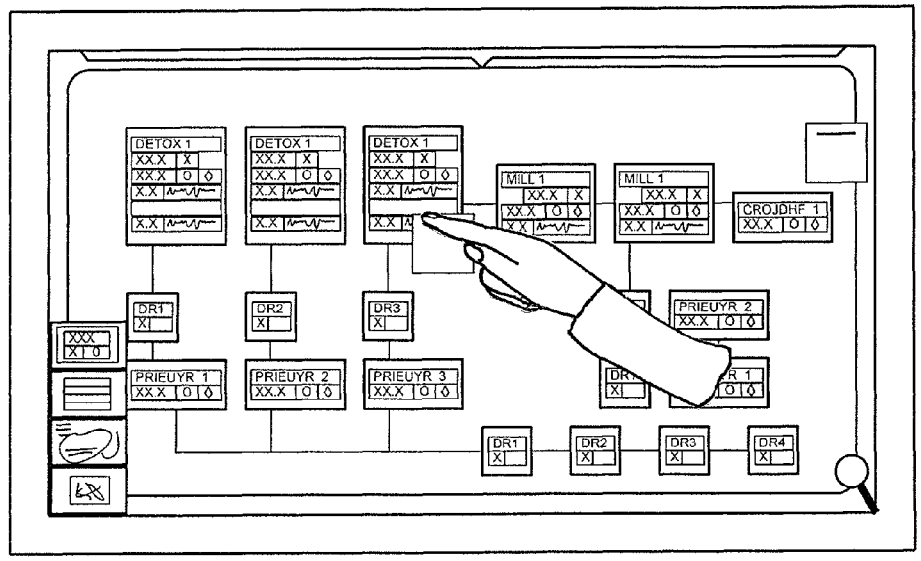
Figure 6:
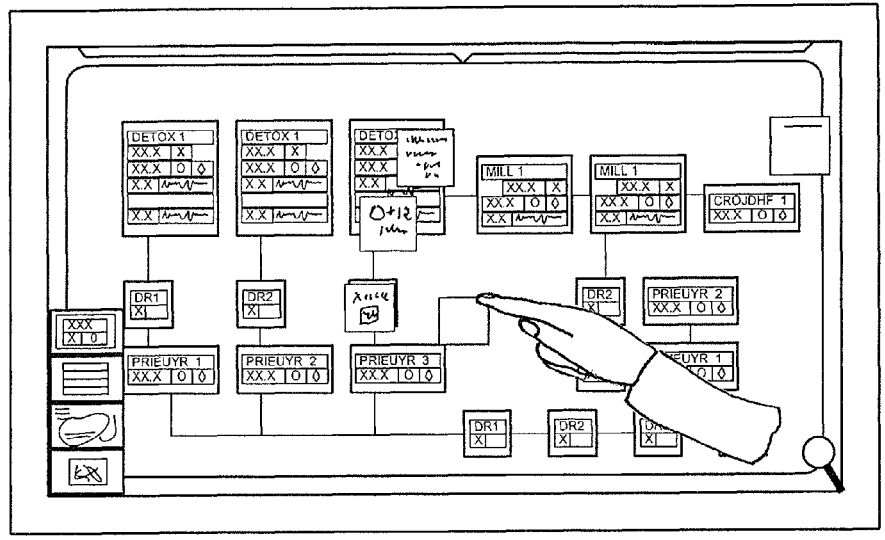
Figure 7:
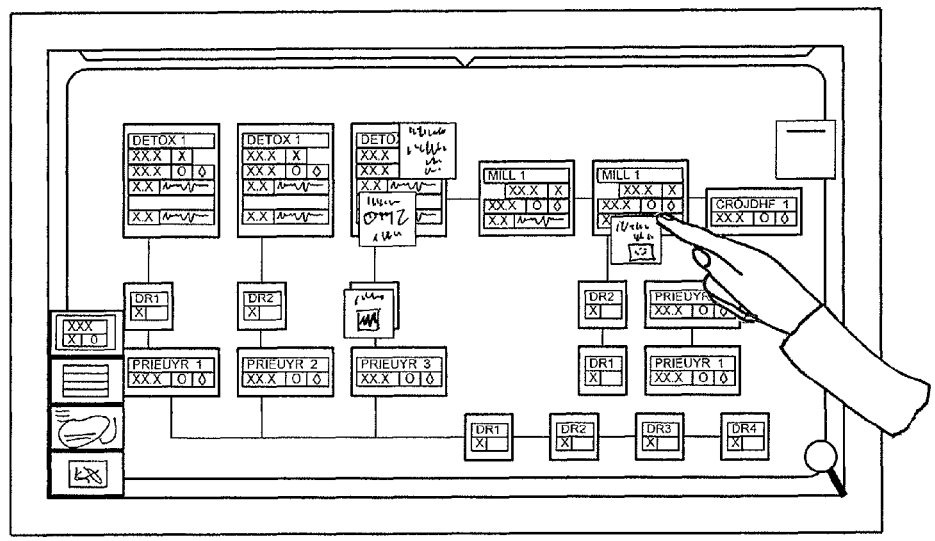
Figure 8:
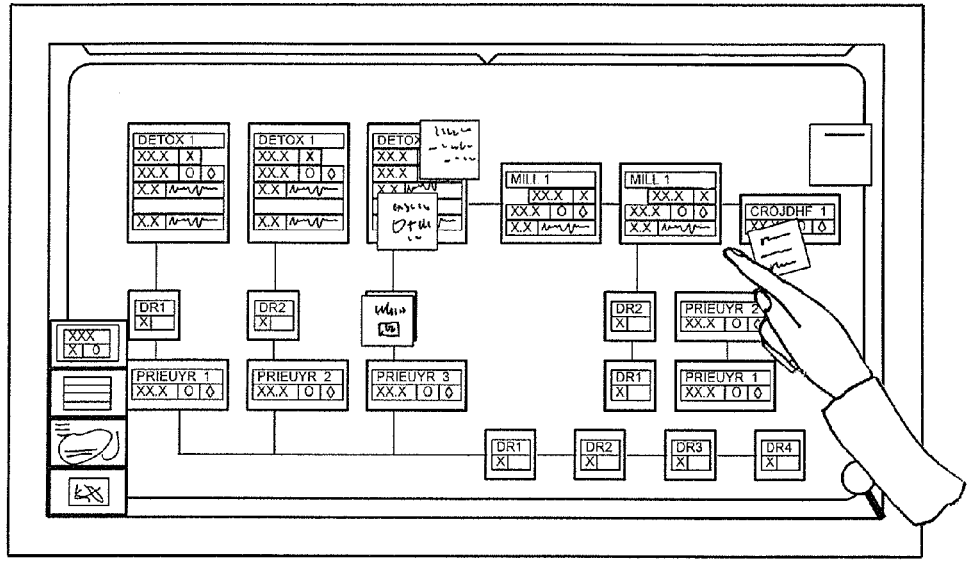

A first function of the invention allows an operator or user working with monitoring of site specific data to add messages directly on the display in the form of virtual notes. A user touches a symbol of a virtual memo pad (FIG. 2) displayed on the display. The pad may be presented on the display all the time and may also always be displayed in the same position on the display. This touching or performing a dragging motion from the pad corresponds to the control unit of the work station receiving a user selection to enter additional data in relation to one or more of the element symbols. As a response to this user selection the control unit provides a user input area on the display (FIG. 3) where the user can enter data, which user input area covers one or more element symbols. It is therefore here larger than the area of the memo pad. The user can here enter data or edit data through drawing figures. The user input area can thus be provided through a paint type of application. As the user inputs data (FIG. 4), these user inputs are registered in the user input area. The user inputs are at the same time displayed in the user input area. At the same time manipulations of element symbols provided underneath the area is disabled. This means that system element symbols provided underneath the user input area cannot be manipulated. After detecting that the user is finished, which may be detected by the user touching or dragging the user input area, the user input area is deactivated, so that inputs are not possible. It is then diminished in size and provided as a manipulable user input area symbol (FIG. 5) that looks as a note and has the entered data displayed on it. It is manipulable in that it may be moved around and placed anywhere on the display as well as selected for editing, in which case the user input area would again be displayed. Such a note may for instance be placed on a graphical symbol of a system element. If a gesture, like a tossing, in the form of a rapid movement of this symbol from one position to another (FIGS. 6 and 7) is detected by the control unit, the symbol is removed (FIG. 8) and the corresponding entered user data deleted. The tossing gesture may be in any direction. The user input area as well as the symbol may here be displayed as opaque or semitransparent to allow the process element symbols underneath it to be viewed. The life time of such a message or note may be pre-specified and when the life time of the note is exceeded the note may be removed through dropping it from the scene displayed. The control unit may thus start a timer when detecting the user being finished entering data and removing the user area symbol when the timer has reached a predetermined value. It is here also possible to toggle the display so that it shows notes and hides notes that have been placed out on the display.

As an alternative to a virtual note, it is possible to have the user input area provided using a digital image, for instance of an element in the process, which digital image is presented on the display. Such a digital image is then also presented as a manipulable symbol on the display. As such a symbol is touched, the image is then enlarged and the user input area provided in an area covered by the enlarged image, where user inputs may be made in the same way as was described above. The user input area is thus provided with the image as background. After again touching the image, it returns and obtains its original size and is displayed with the user inputs on it. Such an image is also a manipulable user areas symbol, which may be moved around feely and tossed away. However, in one embodiment, it may not be possible to place it on a graphical symbol in the same way as a note. It may thus be possible to treat it differently.

Figure 9:
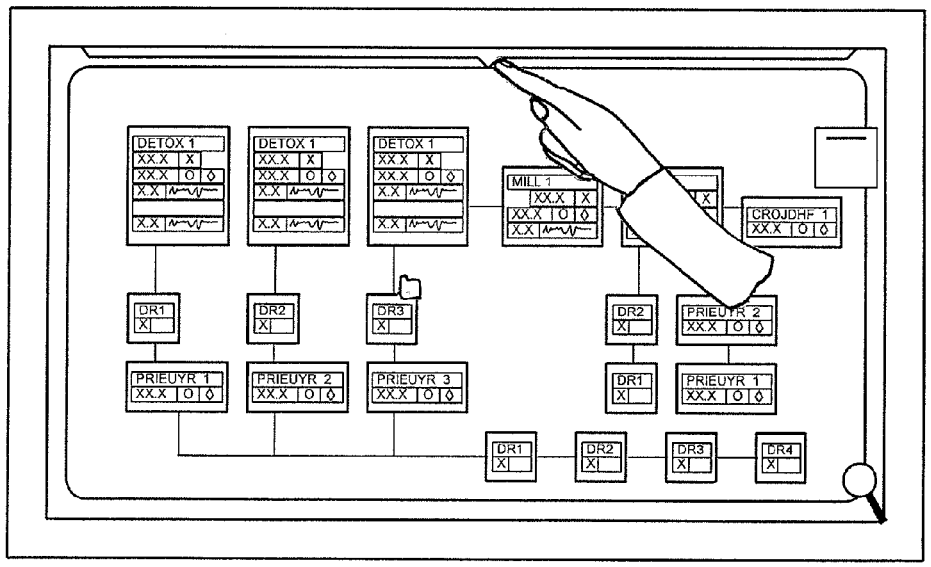
Figure 10:
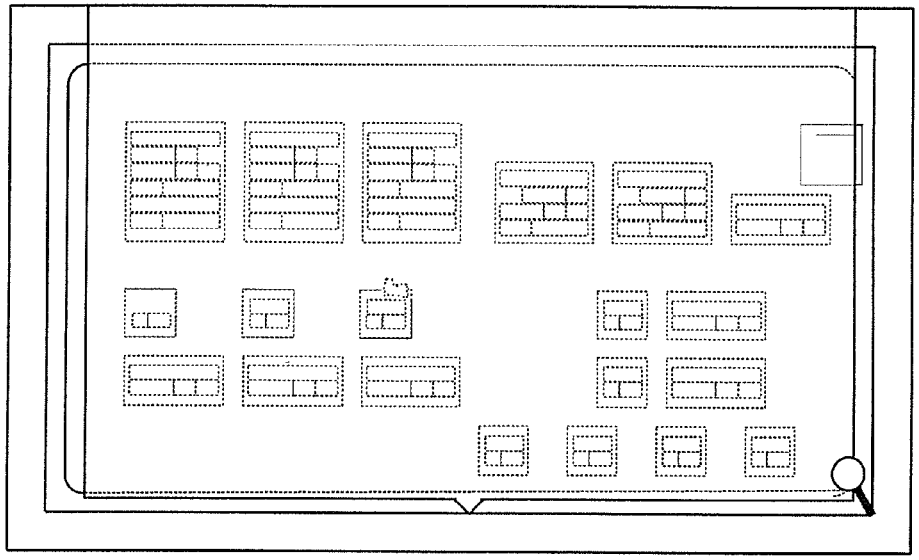
Figure 11:
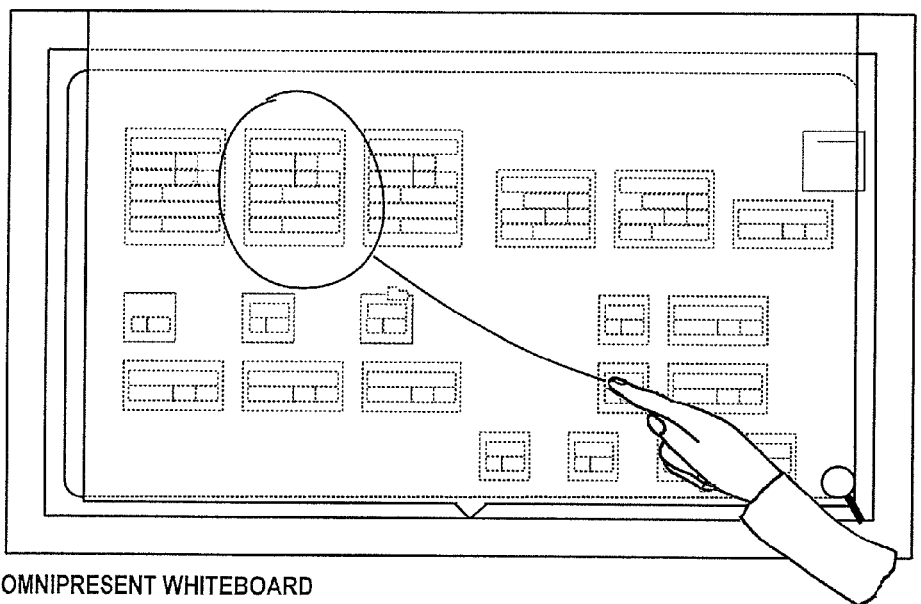
Figure 12:
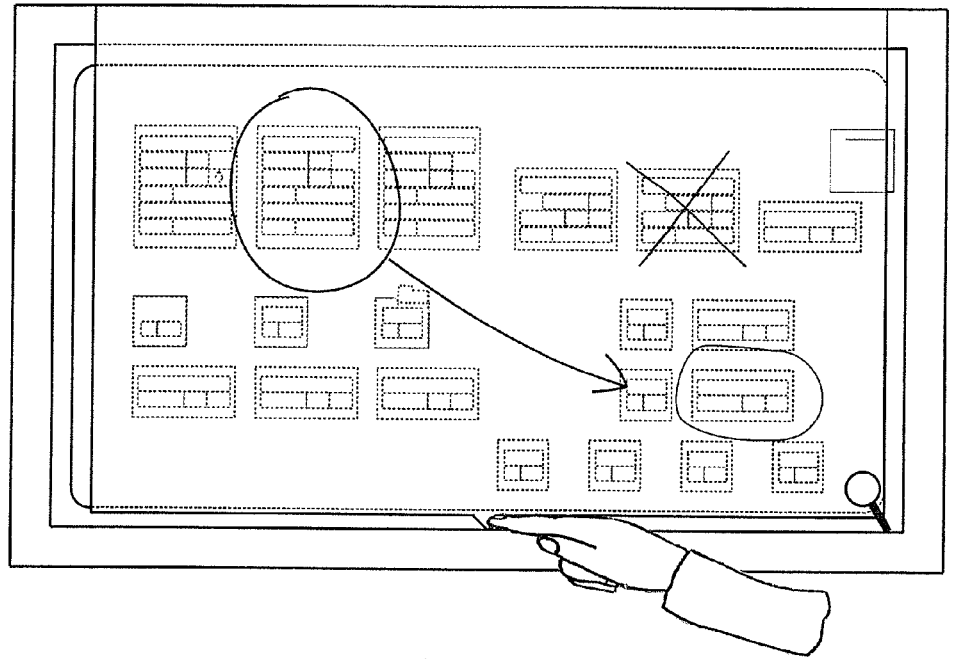

Another function is the provision of a user input area here in the form of a virtual whiteboard. The control unit may here provide the user input area as a roller blind initially displayed as a bar at the top of the view presented on the display. The bar may always be displayed in this position of the display when the user input area is not activated. As the user then touches this bar (FIG. 9) the user selects to add data, the blind is rolled down (FIG. 10), i.e. the control unit detects a user selecting to enter additional data in relation to the system element symbols. The user input area is furthermore provided on the display over all the process element symbols being displayed as a response to this user selection. The user input area may here be opaque but is preferably semitransparent and any manipulations on process elements underneath the user input area are disabled. The user can here draw figures in the same way as before (FIG. 11). It is in fact possible to let several users draw at the same time. The control unit can thus register more than one simultaneous user input and also present or display more than one simultaneous user input simultaneously on the display. The user may deactivate the user input area through touching a pre-determined position on the user input area, preferably a point on the border of the user input area (FIG. 12), in which cased the user input area is removed through rolling up the virtual blind. This touching is thus detected by the control unit as the user being finished entering data and the rolling up of the blind therefore involves a deactivation of the user input area. A blind is furthermore just one example on how the user area may be presented.

Another function concerns navigation. The control unit provides a screen area on which the various process element symbols are shown. This screen area may be divided into fields, where the number of fields here is four. There could of course be more or fewer fields. Normally only one of these fields is however displayed on the display. Possible digital images, note pad and other function related graphical symbols may however be displayed at all times, independently of which section of the screen area that is displayed. They are also shown with the same size all the time. The digital notes placed out on the display do however stay in the sections where they have been placed. There are here a number of ways in which a user can be able to move between these fields.

Figure 13:
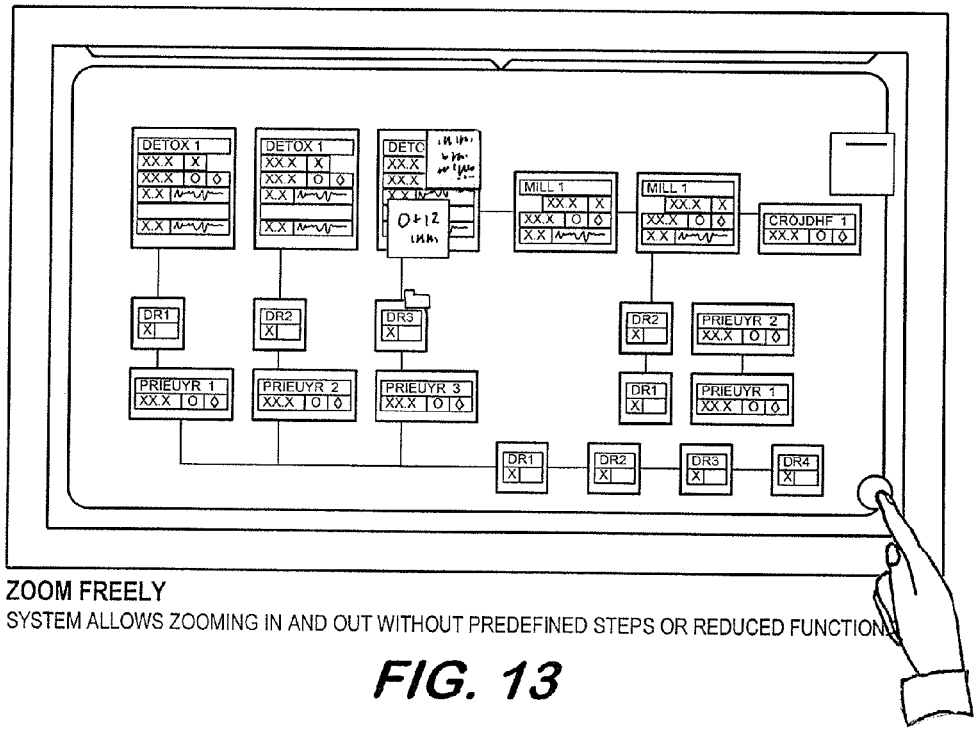
Figure 14:
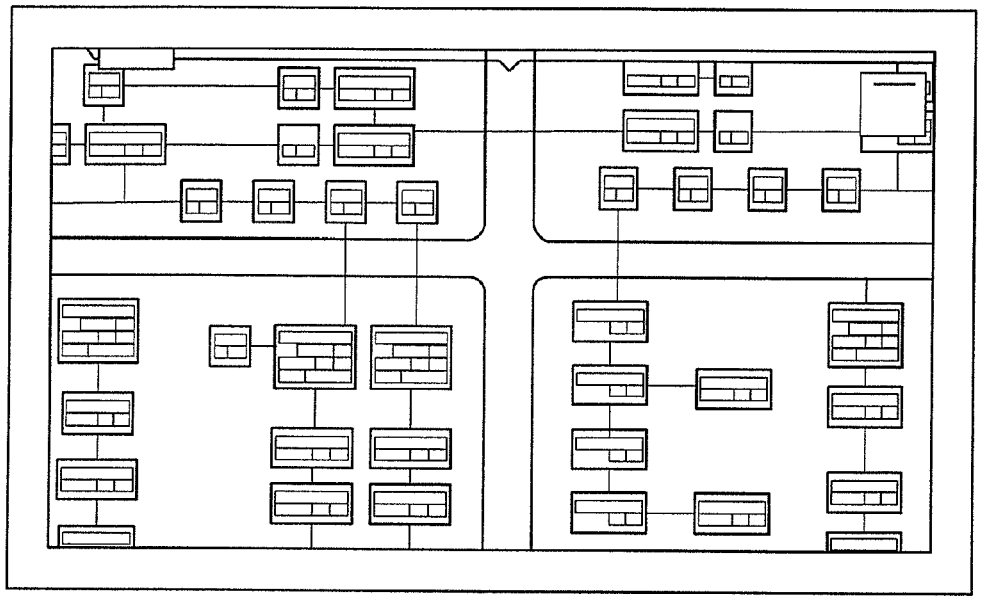
Figure 15:
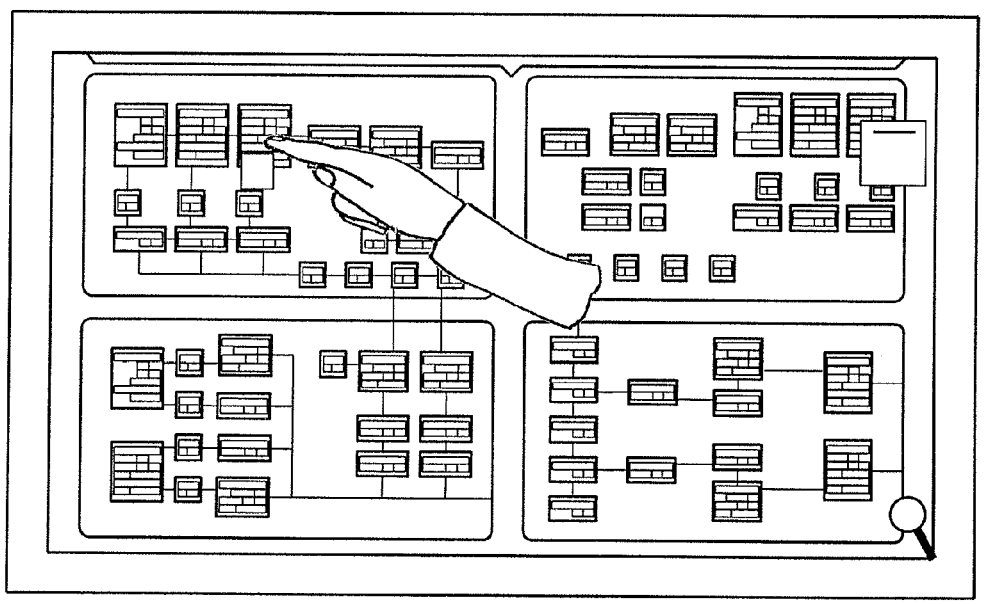
Figure 16:
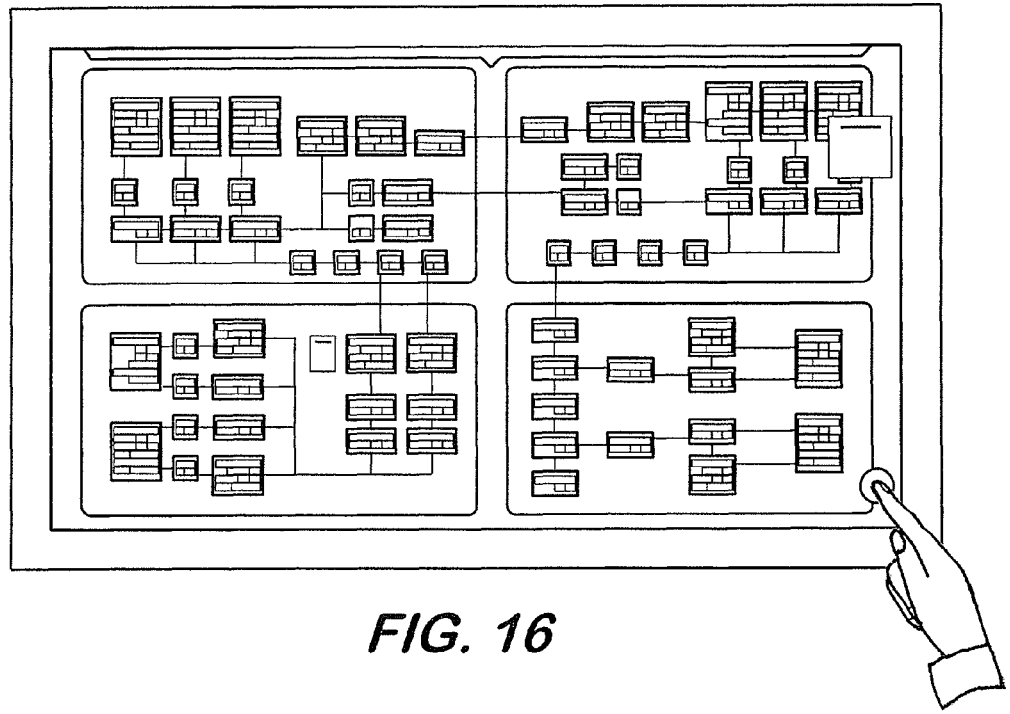
Figure 17:
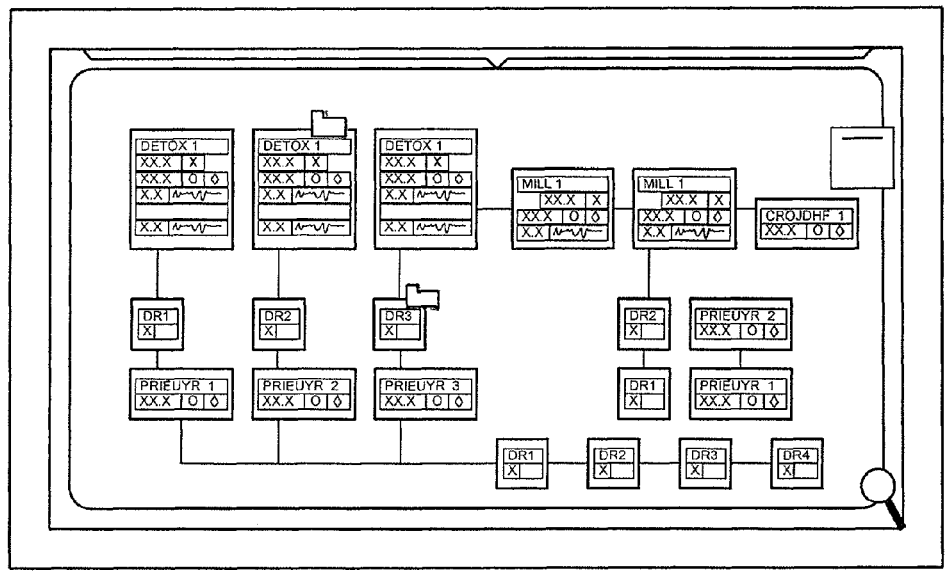

A first way to move is through providing a zooming function. Here there is initially displayed a single first section on the display. The control unit then receives a user selection of a zooming action, which may be done through the user touching a zoom symbol on the display (FIG. 13). This zoom symbol may always be displayed in the same position on the display. The control unit then performs a zooming action by making the display zoom out of the first section to display more sections on the display based on the zooming action selection (FIG. 14). In this way, graphical symbols representing more system elements in the different sections perhaps with notes placed on them may be displayed. The zooming action is here a continuous zooming action, i.e. it is not performed in steps. The display displays all four sections. The user may then manipulate a symbol, like moving, it around and opening a note for editing (FIG. 15). This corresponds to a user selecting a single section to be displayed on the display. When the control unit detects this selection, it may directly order the display to zoom in, which zooming action is here also continuous, and present the single section selected by the user in this way. As an alternative to directly zooming in, the user may again touch the zoom symbol (FIG. 16). As the user again touches this zoom symbol the section in which symbol manipulations were performed is presented (FIG. 17) and in case no symbol manipulations were performed the first section is again presented. It is in this way possible to zoom out as well as navigate between sections of a screen area displayed on the display.

Figure 18:
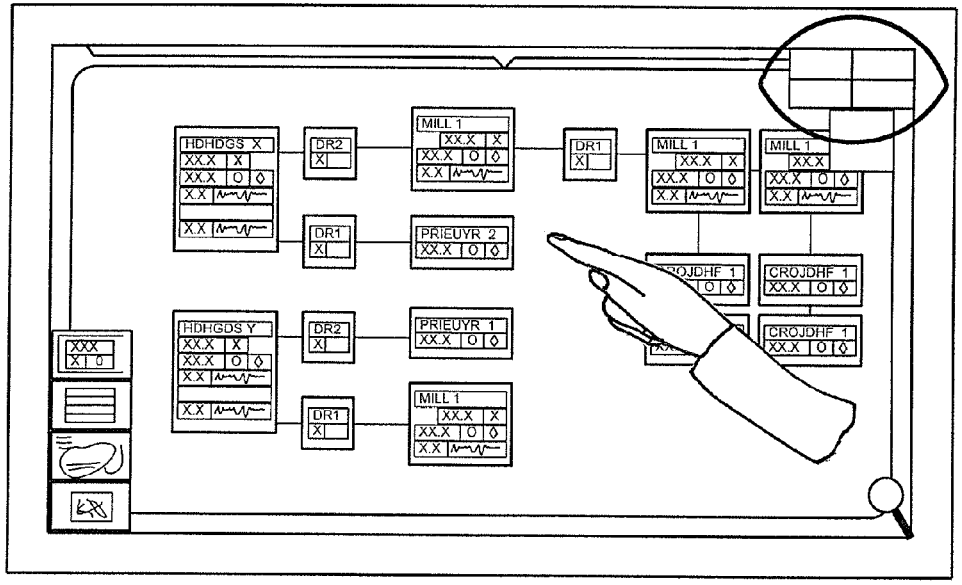

As an alternative or in addition to zooming for changing between sections, the control unit may make the display a set of fields, where each field represents one of the sections (FIG. 18). It is here possible to detect a user selection of a section to be presented through the user touching the corresponding field, whereupon the display goes on and displays the section selected in this way. Also this set of fields would be shown with the same size and in the same position on the display independently of which section is being displayed. The field in the set of fields corresponding to the section being displayed may here also include an indication in order to clearly show to the user which of the various sections that is currently being displayed. This set of fields can as an alternative be displayed with such indications of which field is currently being displayed without enabling navigation between sections. Navigation is then provided in other ways.

Figure 19:
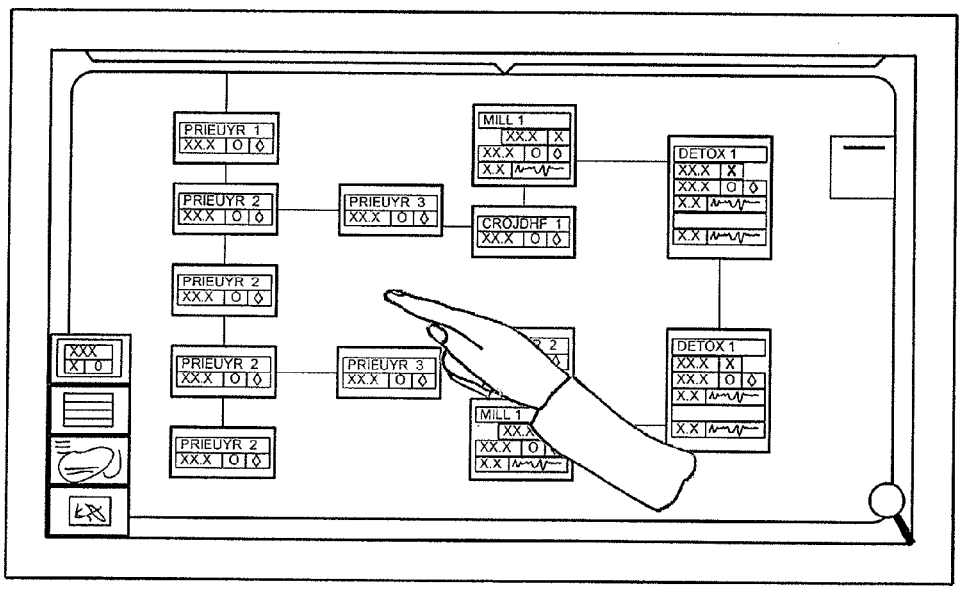

Yet another way to navigate between parts of the screen area is through the use of gestures. Here there is a first part of the screen area being displayed, for instance a section. The control unit may here then detect a gesture being performed by the user on the display and it then orders the display to change the part of the screen area being displayed based on the detected gesture (FIG. 19). The gesture may here involve a dragging motion in one direction on the display and the changing of the part of the screen area displayed may involve moving to a part of the screen area located in the direction of the dragging motion and displaying this part. This thus involves moving to displaying a part of the screen area that is provided at least partly spaced from the previously displayed part of the screen area in the direction of the dragging motion. The gesture may here have to be performed by the user in a part of the screen area being displayed where there are no graphical symbols or other objects. The amount of movement being provided may furthermore be proportional to a property of the gesture, for instance the speed of the gesture or the length of the gesture.

Figure 20:
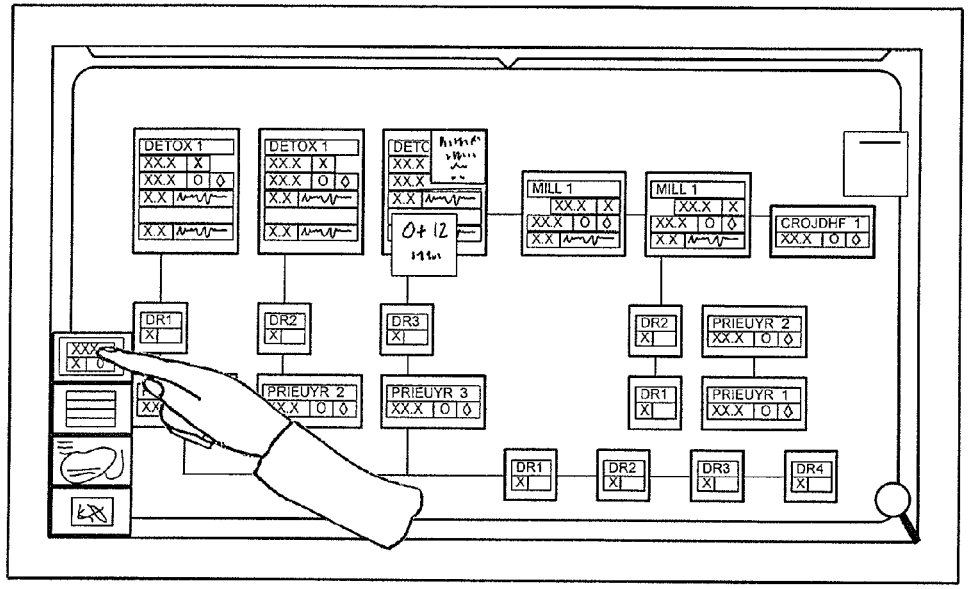
Figure 21:
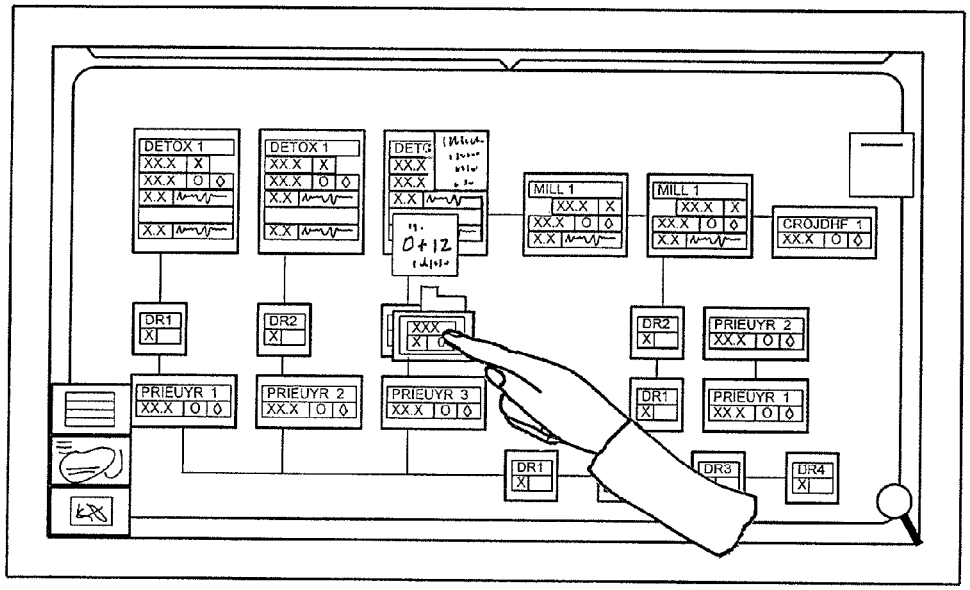
Figure 22:
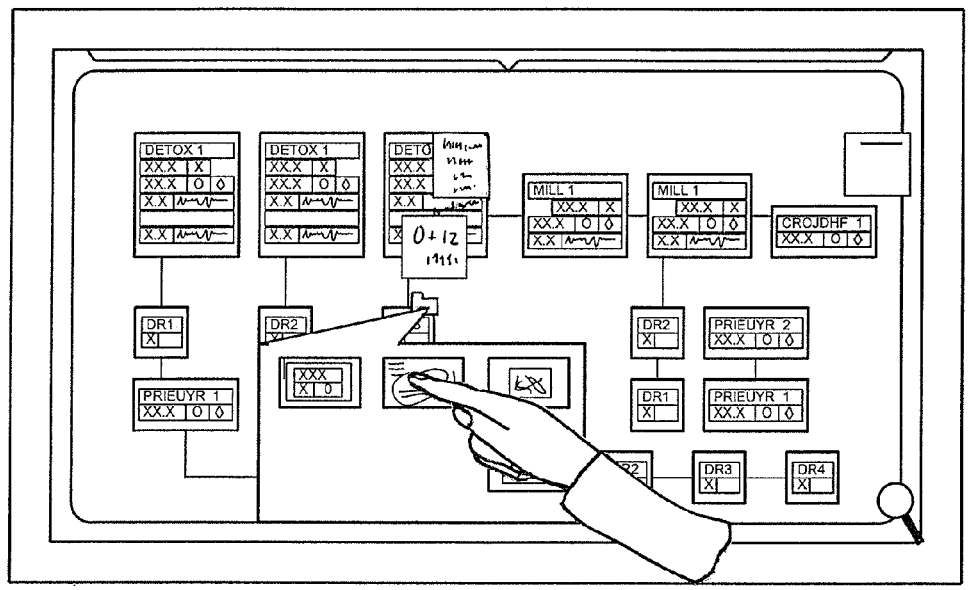

The graphical symbols that represent elements in the system may continuously show data regarding the operation or functioning of the corresponding element in the process, like for instance pressure data, temperature data etc. For this reason the control unit receives such data related to the element, for instance directly from the element in question or perhaps from another element such as a controller which controls the element. It then displays this data on the manipulable graphical symbol for the element. The symbol of the element is thus manipulable in that it can be moved around. It may also be tossed away and deleted through an appropriate tossing gesture. However here this symbol also acts as a folder in which other objects displayed on the display may be inserted. If a user here touches another object on the display, such as a digital image (FIG. 20) or a note, and places this other object on top of the graphical symbol representing the system element (FIG. 21), this is detected by the control unit. The control unit may then indicate that the object will be placed in the folder of the graphical symbol representing the system element, for instance through highlighting the symbol or encircling it by a rectangle or through some other suitable indication, and then places this other object in the folder. As the user stops touching the other object it is then placed in the folder. Thereafter the control unit changes the appearance of this graphical symbol on the display for indicating that it includes other objects, which may be done through providing a folder indicator on a part of the graphical symbol representing the element, for instance at a corner of this symbol. In this way there is provided an indication on said graphical symbol for the system element that it includes other objects. A user may here at any time see what objects are contained in such a folder. Thus if the user points to or touches the symbol, for instance at the part, the appearance of which has been changed, here on the folder shaped part of the graphical symbol, the control unit detects this and then displays the objects in the folder on the display based on this detection (FIG. 22). The user may then further investigate these objects, remove them or perform some other action on them. If the user then again points to or touches the symbol, for instance at the part the appearance of which has been changed, the objects in the folder are stopped from being displayed.

The data received in relation to a system element, for instance data relating to the functioning of the element, is not restricted to being displayed on the corresponding graphical symbol. Such data may be transmitted to other devices.

Figure 23:
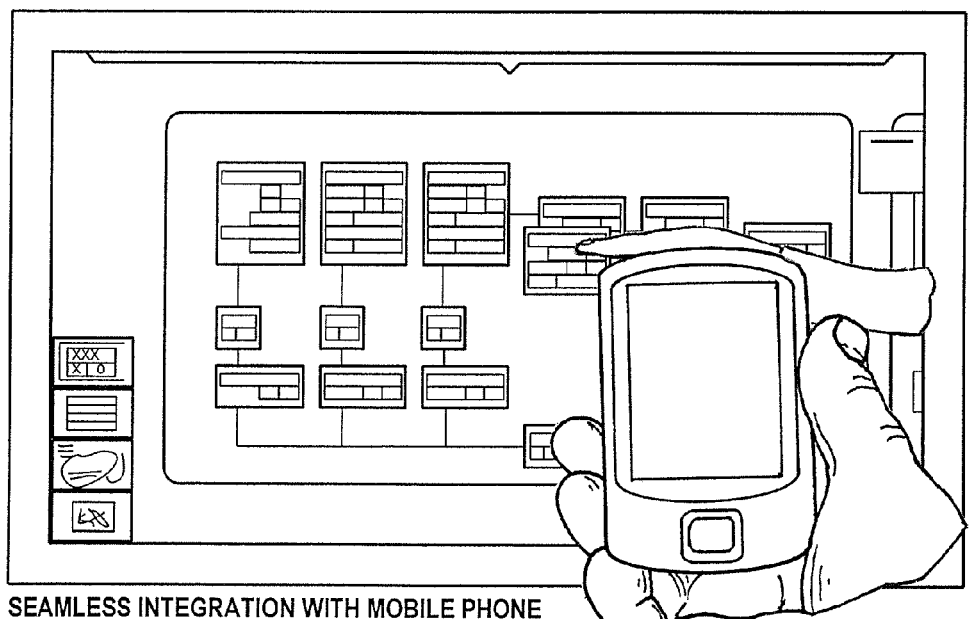
Figure 24:
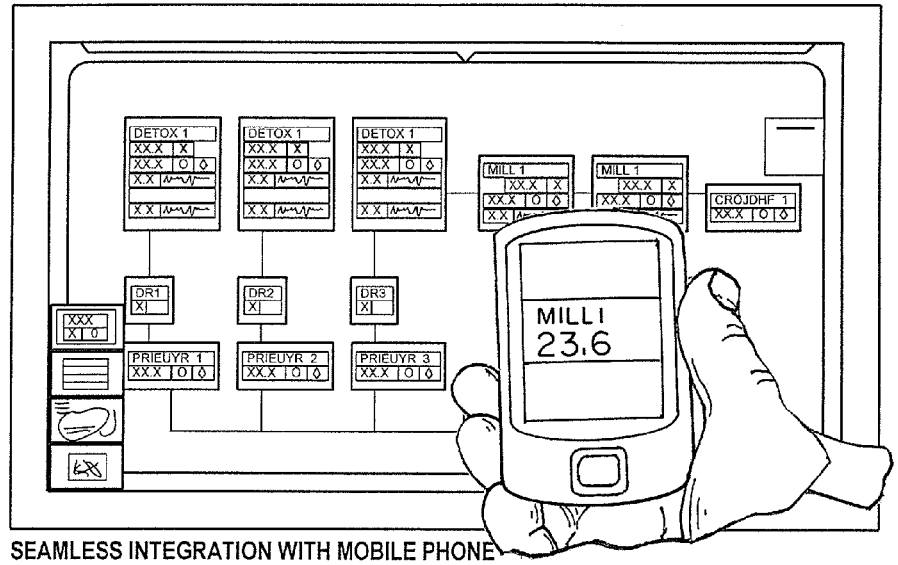
Figure 25:
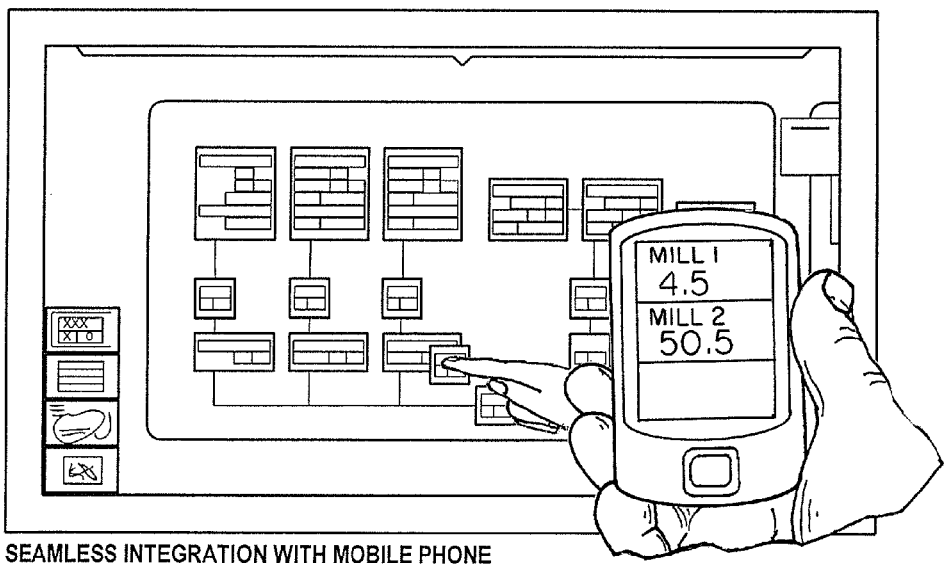
Figure 26:
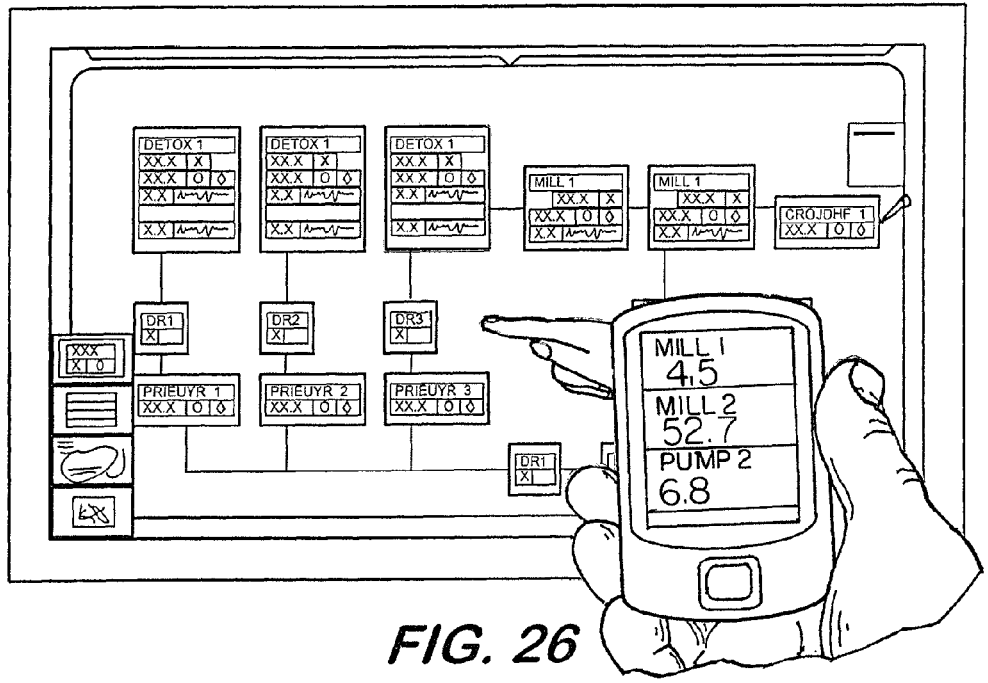

In case the user touches or starts to drag such a graphical symbol representing a system element (FIG. 23), this touching is detected by the control unit as being a user selection of this graphical symbol. The control unit may then zoom out the view and then provide a user reserved area. The location of the user reserved area on the display may be indicated through providing a human shadow that is shown on the display. If the user then moves such a selected graphical symbol for a process element to this user reserved area, this is detected by the control unit. It then transmits or orders a device in the process control system to transmit such data relating to the element in the process to a portable wireless communication device associated with the user for being presented on this device (FIGS. 24, 25 and 26). In this way the graphical symbol is thus assigned to the device of the user. If the user reserved area covers any graphical symbols on the display, these symbols cannot be manipulated as long as the user reserved area is shown. It is of course at the same time possible to also display the data in question also on the corresponding graphical symbol.

The device of the user may for instance be a laptop computer, a palm top computer or a cellular phone. It may be able to communicate using for instance WLAN. Such a WLAN may be connected to or be a part of the computer network shown in FIG. 1. Communication may also be made via a cellular network, which the work station may be able to access directly or using a communication server in the network of FIG. 1. It should here be realized that the work station may include or have access to a user setting store including data of such portable devices associated with each user. There may here be several types of devices associated with a user and the user may also select which is the one that is to be used. The control unit of the work station may then select which device to send data to based on which user that drags the graphical symbol on the display and select the device in this store associated with the user, i.e. a device for which there is a setting for the particular user. The user for which such activities are being performed may be determined in a number of ways. The user can be determined through him/her being logged onto the work station. The user may also be determined through the work station being provided with or having access to local communication means, such as rfid or Bluetooth. If the user, in the case of rfid, carries a corresponding rfid tag, this may return a user identity, through which the control unit of the work station may be able to determine user. In case the portable device or another device the user carries has Bluetooth functionality, the identity of this device in such communication may also be used for determining the identity of the user.

Another function provided by the work station is to present additional data in relation to an element in a process in a simple way. In addition to the manipulable graphical symbols representing system elements there is here provided a graphical symbol associated with a certain data type, which may be a media data type such as sound, still images, video or combined sound and video. It may also be statistical data. This graphical symbol may here be shaped as a device that is able to pick up or register such data. In the case of sound it may thus be shaped as a microphone. In the case of digital still images it may be shaped as a camera and in the case of video data it may be shaped as a camcorder.

Figure 27:
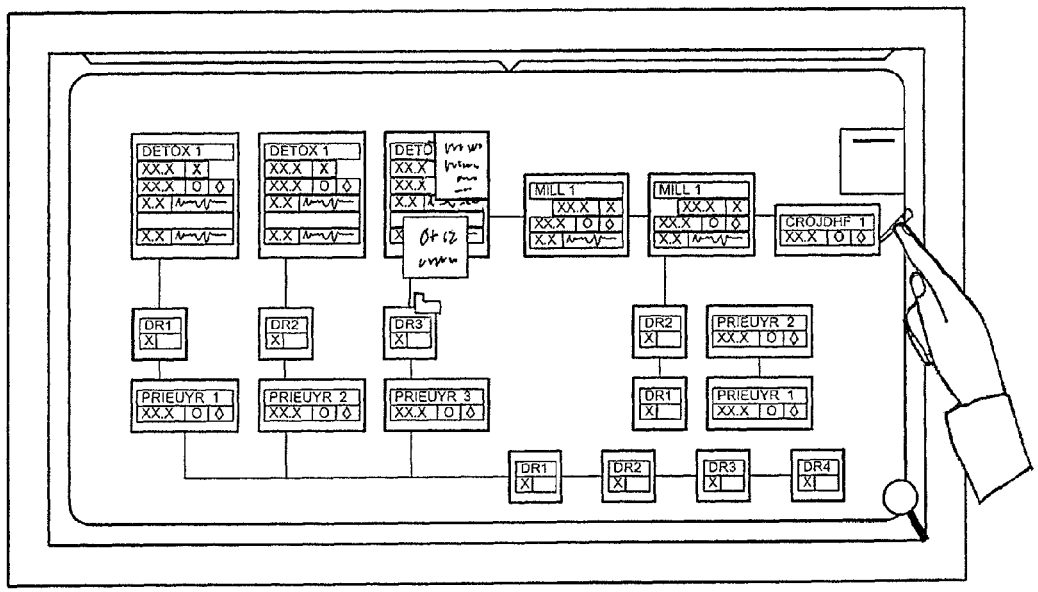
Figure 28:
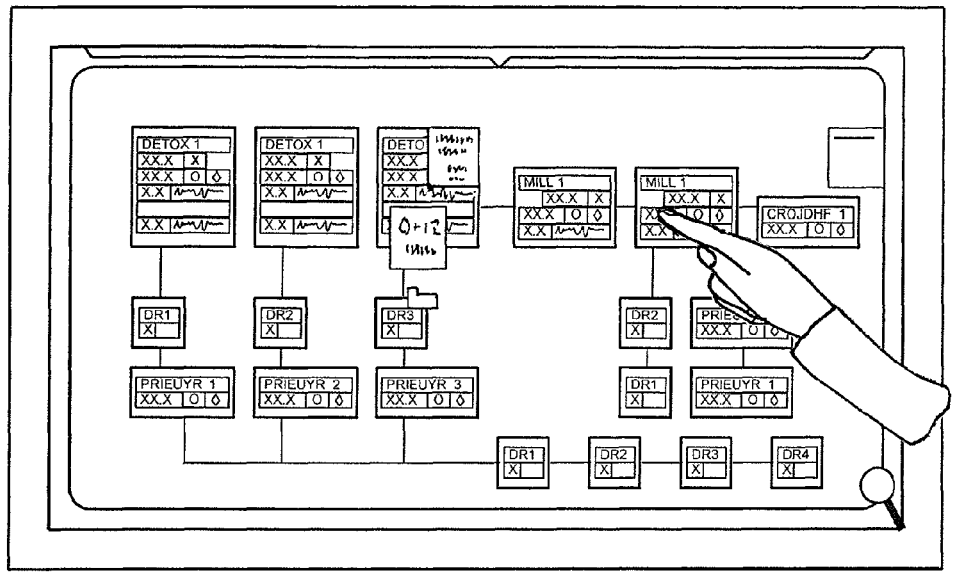

If the user selects and moves such a symbol associated with a data type (FIG. 27) this is detected by the control unit. If the control unit then detects that this symbol is moved onto a graphical symbol representing a system element (FIG. 28), the control unit fetches data associated with the element of the data type represented by the data type symbol. In the example of a microphone it thus fetches sound data being recorded in relation to the element, for instance by a microphone located at the element and presents it via speakers of the work station. In the case of still image it would fetch a digital image from a camera located at the element and present it on the display and if the data was a video, it would fetch video data from a video camera located at the element. The recording functionality may furthermore in some instances be provided by the element itself. For other types of data it would have fetched statistical data, for instance presented in the form of a curve or a circuit diagram of a circuit implemented by the element. Such data may be fetched from a server, which receives this type of data from various recording devices provided at an element, or from a server storing various types of statistical data in relation to elements of the system. In the case of sound, images and video, the data may be live data directly obtained from or by the element.

A further function provided by the work station is to enable obtaining of media data regarding the system from a system user through providing this system user with a media recording device. This media recording device is here not associated with an element but with the work station. It may also be a media recording device associated with a system. A media recording device may here be a sound recording device, a still image recording device, a moving image recording device or a combined moving image and sound recording device.

Figure 29:
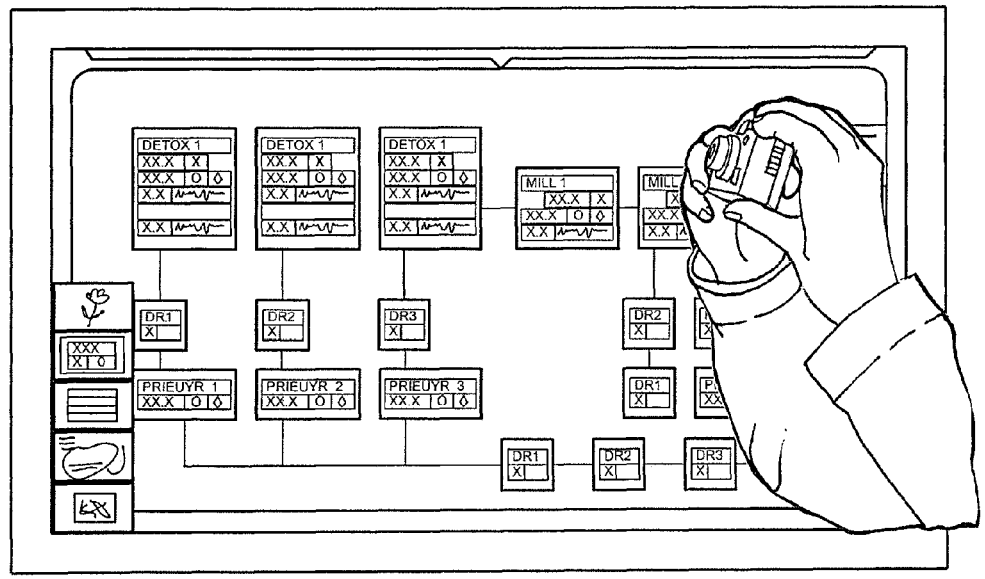
Figure 30:
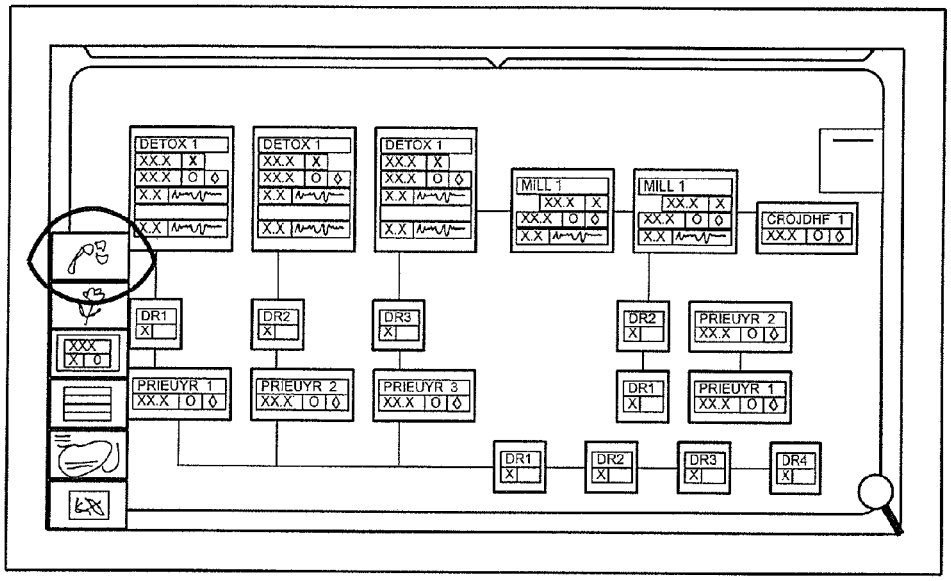
Figure 31:
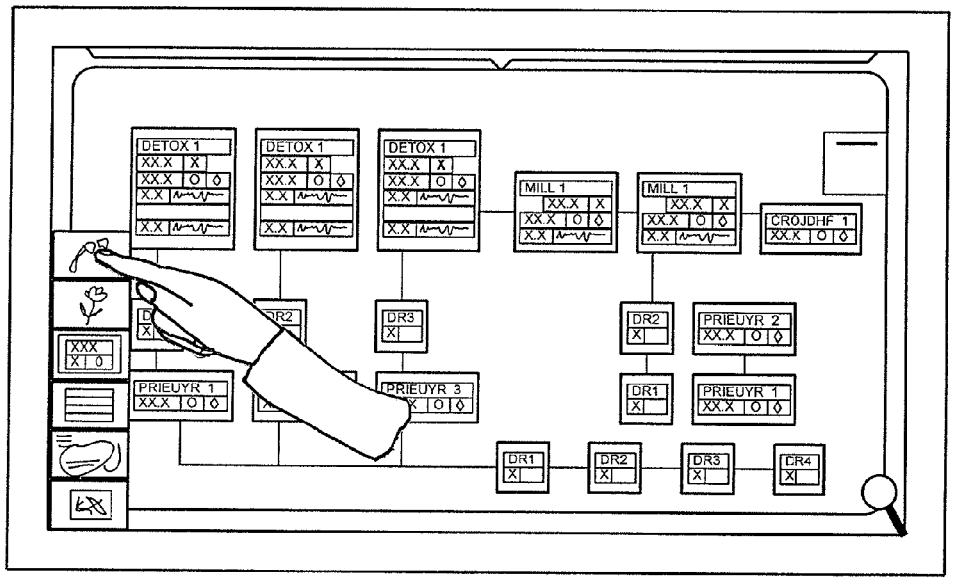
Figure 32:
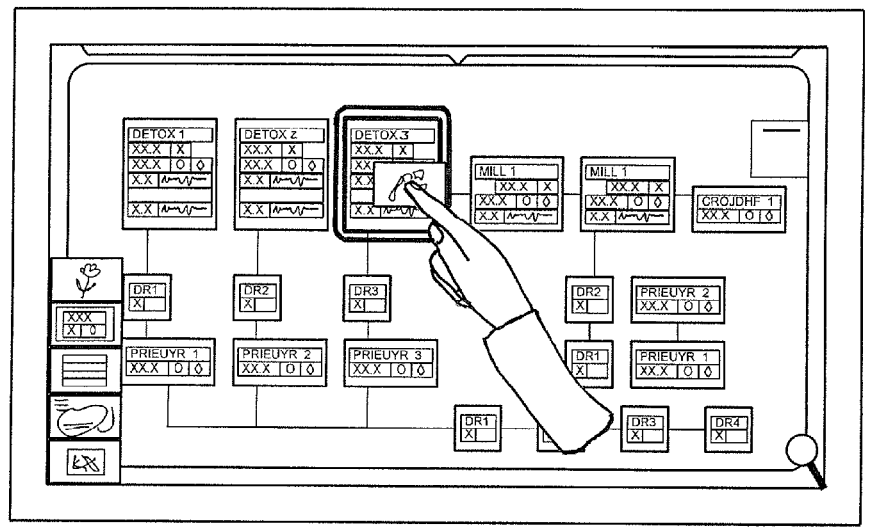

As a system user records media data via a media recording device, for instance captures an image (FIG. 29) using a camera associated with the work station, this media data is sent from the media recording device directly to the system as soon as the media data is recorded. This recorded media data is then received by the work station. The work station thus receives the media data and it then presents at least the existence of it on the display. It may of course also present the media. It may here present the existence of the media data as a manipulable graphical symbol representing the recorded media data. In the case of a still image the symbol may be the actual image (FIG. 30), which may thus be manipulable. This graphical symbol or representation of the recorded data may then be treated in the previously described manner, such as drawn upon and/or inserted into a combined graphical symbol and folder for a system element (FIG. 32), which folder may with advantage be the folder of an element in the system, from which the media data emanates. It may for instance be a picture of the element. The media data may here be sent directly from the media data recording device to the work station via the system in FIG. 1 or it may be sent from the media data recording device to a location on a media storage or a media library being associated with the media recording device. This location may here be polled by the work station in order to determine that there exists new media data, the existence of which should be indicated on the display or the work station may be alerted that there exists new media data at the location.

It may here be possible to more closely associate the recorded media data with an element of the system where the media data is being recorded.

Figure 33:
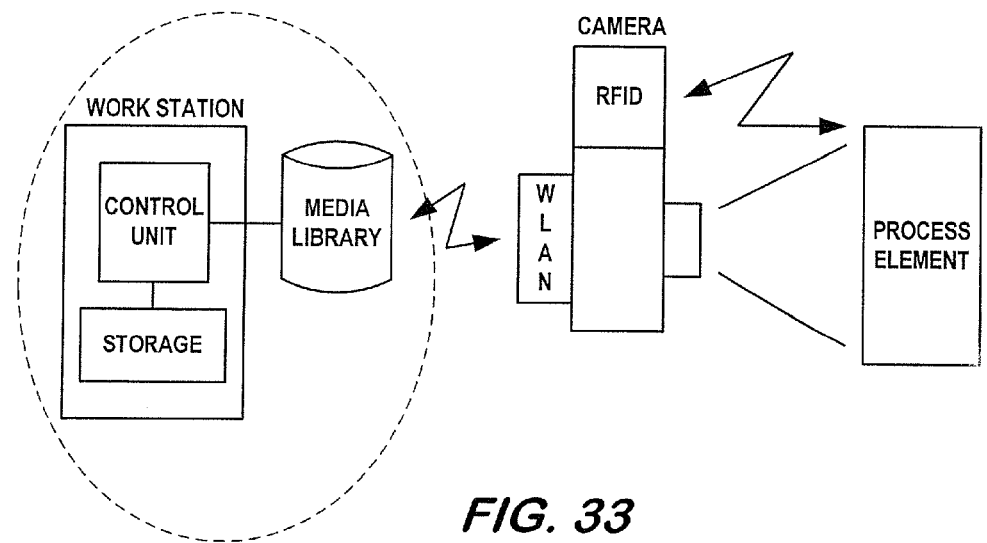
FIG. 33 is a schematic of an embodiment of the present invention.

The recording device may be provided with an element determination data obtaining unit providing element determination data to the system. This element determination data may be the position of the element, in which case the unit may be a positioning unit like a GPS unit. The unit may also be a communication unit like an rfid unit, which reads a tag on the element providing element determination data in the form of an element identifier. The recording device may be provided with a communication interface like a WLAN, Bluetooth or a cellular communication interface with which it is able to communicate with the system. In this way the recording device sends the recorded media data together with the element determination data, for instance to a media library or directly to the work station. The work station will then receive the media data and the element determination data either directly from the recording device or from the media library. It will then look in a storage where a mapping of such element determination data to system elements is made. This storage may be a part of the work station or it may be provided in another entity in the system. By looking in this storage the control unit of the work station will therefore compare the element determination data with corresponding element identifying data stored for the various elements of the system and identify a system element based on the comparison. In the case of identifiers there will normally be match between element determination data and element identifying data. In the case of position the element may be selected through selecting the element which has the closest position to the position of the recording device. The control unit will then provide at least an indication of which presented graphical symbol corresponds to the identified element as the existence of the media is presented. This may be done through for instance marking or highlighting the graphical symbol representing the element. It may here of course also directly insert the media data or the representation of it in the combined graphical symbol and folder for the element. See FIG. 33.

While the invention has been specifically described in connection with certain specific embodiments thereof, it is to be understood that this is by way of illustration and not of limitation and that various changes and modifications in form and details may be made thereto, and the scope of the appended claims should be construed as broadly as the prior art will permit.

The description of the invention is merely exemplary in nature, and thus, variations that do not depart from the gist of the invention are intended to be within the scope of the invention. Such variations are not to be regarded as a departure from the spirit and scope of the invention.

What is claimed is:

1. A method of providing a user with data on a workstation of a process control system, the data relating to an element among a plurality of process elements in a process, the method comprising the steps of:
   providing representations of the plurality of process elements on a display of the workstation as manipulable graphical symbols,
   receiving media data at the workstation from a media recording device, the media recording device being associated with the workstation or the process control system, the media recording device being configured to send the media data to the process control system after recording the media data,
   receiving an element identifier obtained by an element determination data obtaining unit that is arranged together with the media recording device when the media data is recorded, the element determination data obtaining unit reading a tag disposed on and associated with the element without use of the media data to retrieve the element identifier and to provide the element identifier to the process control system,
   receiving the element identifier together with the media data,
   comparing the element identifier with element identifying data stored for the plurality of process elements,
   identifying the element based on the comparison of the element identifier with the element identifying data;
   wherein, in response to identifying the element based on said comparison,
   providing an indication of which graphical symbol of said manipulable graphical symbols corresponds to the identified element by highlighting the graphical symbol as the media data is being received,
   directly inserting a representation of the media data into the graphical symbol corresponding to the identified element, said graphical symbol is a folder as well, and
   adding a single icon on a part of said graphical symbol to signal direct insertion of the media data into the folder of said graphical symbol, said icon being selectable to display said representation of said media data contained in the folder.

2. The method according to claim 1, further comprising the step of detecting the user placing a representation of other data on the graphical symbol corresponding to the identified element, and inserting the representation of said other data in the folder, wherein said icon is selectable to display the representation of said media data and the representation of said other data.

3. The method according to claim 1, further comprising the steps of detecting a first pointing by the user to the part of the graphical symbol having the selectable icon and displaying content in the folder on the display based on the detection of the first pointing.

4. The method according to claim 3, further comprising the steps of detecting a second pointing by the user to the part of the graphical symbol having the selectable icon and stopping the step of displaying the content in the folder based on the detection of the second pointing.

5. The method of claim 1, further comprising the steps of:
   detecting the user selecting the graphical symbol representing the element,
   providing a user reserved area on the display, and
   if detecting that the graphical symbol is being moved to the user reserved area, continuously transmitting or ordering a device in the process control system to continuously transmit data relating to a functioning of the element in the process to a portable wireless communication device associated with the user for being presented on this device.

6. The method according to claim 5, further comprising the step of receiving the data from the element or the device relating to the control of the element in the process.

7. The method according to claim 5, further comprising the step of receiving data enabling identification of the user and selecting a user device based on a setting of user devices provided in a user setting store.

8. The method according to claim 7, wherein the user identification enabling data is received through the user logging onto the workstation or wirelessly from an identification device carried by the user.

9. The method of claim 1, wherein the symbols are provided on a screen area of the display that is larger than an area covered by the display, and further comprising the steps of:
   displaying a part of the screen area,
   detecting a gesture performed by the user on the display, and
   changing the part of the screen area displayed based on the detected gesture.

10. The method according to claim 9, wherein the gesture involves a dragging motion in one direction on the display and the step of changing the part of the screen area displayed involves moving to a part of the screen area located in the direction of the dragging motion and displaying this part.

11. A computerized workstation in a process control system including a display, a user input unit and a control unit having a processor, the processor being configured to:
provide representations of a plurality of process elements in a process on the display as manipulable graphical symbols,
receive media data from a media recording device, the media recording device being associated with the workstation or the process control system, the media recording device being configured to send the media data to the process control system after recording the media data,
receive an element identifier obtained by an element determination data obtaining unit that is arranged together with the media recording device when the media data is recorded, the element identifier being retrieved via the element determination data obtaining unit by reading a tag disposed on and associated with the element without use of the media data,
receive the element identifier together with the media data,
compare the element identifier with element identifying data stored for the plurality of process elements,
identify the element based on the comparison of the element identifier with the element identifying data,
wherein, in response to identifying the element based on said comparison, the processor configured to:
provide an indication of which graphical symbol of said manipulable graphical symbols corresponds to the identified element by highlighting the graphical symbol as the media data is being received,
directly insert a representation of the media data into the graphical symbol corresponding to the identified element, said graphical symbol is a folder as well, and
add a single icon on a part of said graphical symbol to signal direct insertion of the media data into the folder of said graphical symbol, said icon being selectable to display said representation of said media data contained in the folder.

12. The computerized workstation according to claim 11, the processor is further configured to detect the user placing a representation of other data on the graphical symbol corresponding to the identified element, and insert the representation of said other data in the folder, wherein said icon is selectable to display the representation of said media data and the representation of said other data.

13. The computerized workstation according to claim 11, further comprising a storage for storing data relating to at least some of activities performed at said workstation.

14. The computerized workstation according to claim 11, wherein the processor is further configured to detect a first pointing by the user to the part of the graphical symbol having the selectable icon and display content in the folder on the display based on the detection of the first pointing.

15. The computerized workstation according to claim 14, wherein the processor is further arranged to detect a second pointing by the user to the part of the graphical symbol having the selectable icon and stop displaying the content in the folder based on the detection of the second pointing.

16. The computerized workstation of claim 11, wherein the processor is further arranged to:
detect the user selecting the graphical symbol representing the element,
provide a user reserved area on the display, and
if detecting that the graphical symbol is being moved to the user reserved area, continuously transmit or order a device in the process control system to continuously transmit data relating to a functioning of the element to a portable wireless communication device associated with the user for being presented on this device.

17. The computerized workstation according to claim 16, where the processor is further arranged to receive the data from the element or the device relating to the control of the element in the process.

18. The computerized workstation according to claim 16, wherein the processor is further arranged to receive data enabling identification of the user and selecting a user device based on a setting of user devices provided in a user setting store.

19. The computerized workstation according to claim 18, wherein the user identification enabling data is received through the user logging onto the workstation or wirelessly from an identification device carried by the user.

20. The computerized workstation of claim 11, wherein the symbols are provided on a screen area of the display that is larger than an area covered by the display, and wherein the processor is further arranged to:
display a part of the screen area,
detect a gesture performed by the user on the display, and change the part of the screen area displayed based on the detected gesture.

21. A computer program product on a non-transitory data carrier comprising computer program code configured to, when the program code is loaded into a workstation provided in a process control system,
provide representations of a plurality of process elements in a process on a display as manipulable graphical symbols,
receive media data at the workstation from a media recording device, the media recording device being associated with the workstation or the process control system, the media recording device being configured to send the media data to the process control system after recording the media data,
receive an element identifier obtained by an element determination data obtaining unit that is arranged together with the media recording device when the media data is recorded, the element identifier being retrieved via the element determination data obtaining unit by reading a tag disposed on and associated with the element without use of the media data,
receive the element identifier together with the media data,
compare the element identifier with element identifying data stored for the plurality of process elements,
identify the element based on the comparison of the element identifier with the element identifying data,
wherein, in response to identifying the element based on said comparison,
provide an indication of which graphical symbol of said manipulable graphical symbols corresponds to the identified element by highlighting the graphical symbol as the media data is being received,
directly insert a representation of the media data into the graphical symbol corresponding to the identified element, said graphical symbol is a folder as well, and
add a single icon on a part of said graphical symbol to signal direct insertion of the media data into the folder of said graphical symbol, said icon being selectable to display said representation of said media data contained in the folder.

22. The computer program product of claim 21, wherein the computer program code is further configured to:
- detect the user selecting the graphical symbol representing the element,
- provide a user reserved area on the display, and
- if detecting that the graphical symbol is being moved to the user reserved area, continuously transmit or order a device in the process control system to continuously transmit data relating to a functioning of the element in the process to a portable wireless communication device associated with the user for being presented on this device.

23. The computer program product of claim 21, wherein the computer program code is further configured to:
- display the symbols on a screen area that is larger than an area covered by the display,
- display a part of the screen area,
- detect a gesture performed by the user on the display, and
- change the part of the screen area displayed based on the detected gesture.

24. A method of providing a user with data relating to an element in a process being presented on a display of a workstation of a process control system, comprising the steps of:
- providing a representation of the element on the display as a first graphical symbol,
- providing a second graphical symbol which indicates a certain type of data to be fetched by the workstation from the process,
- detecting a user selecting and moving the second graphical symbol to the first graphical symbol,
- fetching data from one of the element or a media recording device which provides the certain data type indicated by the second graphical symbol in response to the detection, the data being associated with the element and having the certain data type indicated by the second graphical symbol according to the detection, and
- providing an indication of the first graphical symbol by highlighting the first graphical symbol as the data is being received,
- directly inserting a representation of the media data into first graphical symbol, said first graphical symbol is a folder as well,
- adding a single icon on a part of the first graphical symbol to signal direct insertion of the data into the folder of the first graphical symbol, said icon being selectable to display said representation of said data contained in the folder.

25. The method according to claim 24, wherein the data type is media data in a group of sound, image and video relating to the element.

26. The method according to claim 24, where the data is statistical data presented in a form of a curve.

27. The method according to claim 24, wherein the data is a circuit diagram of the element.

28. The method of claim 24, further comprising the steps of:
- detecting the user selecting the graphical symbol representing the element,
- providing a user reserved area on the display, and
- if detecting that the graphical symbol is being moved to the user reserved area, continuously transmitting or ordering a device in the process control system to continuously transmit data relating to a functioning of the element in the process to a portable wireless communication device associated with the user for being presented on this device.

29. The method according to claim 28, further comprising the step of receiving the data from the element or the device relating to the control of the element in the process.

30. The method according to claim 28, further comprising the step of receiving data enabling identification of the user and selecting a user device based on a setting of user devices provided in a user setting store.

31. The method according to claim 30, wherein the user identification enabling data is received through the user logging onto the workstation or wirelessly from an identification device carried by the user.

32. The method of claim 24, wherein the symbols are provided on a screen area of the display that is larger than an area covered by the display, and
further comprising the steps of:
- displaying a part of the screen area,
- detecting a gesture performed by the user on the display, and
- changing the part of the screen area displayed based on the detected gesture.

33. The method according to claim 32, wherein the gesture involves a dragging motion in one direction on the display and the step of changing the part of the screen area displayed involves moving to a part of the screen area located in the direction of the dragging motion and displaying this part.

34. A computerized workstation in a process control system including a display, a user input unit and a control unit having a processor, the processor being arranged to perform a method of providing a user with data relating to an element in a process being presented on a workstation display of a process control system, the method comprising the steps of:
- providing a representation of the element on the display as a first graphical symbol,
- providing a second graphical symbol which indicates a certain type of data to be fetched by the workstation from the process,
- detecting a user selecting and moving the second graphical symbol to the first graphical symbol,
- fetching data from one of the element or a media recording device which provides the certain data type indicated by the second graphical symbol in response to the detection, the data being associated with the element and having the certain data type indicated by the second graphical symbol according to the detection, and
- providing an indication of the first graphical symbol by highlighting the first graphical symbol as the data is being received,
- directly inserting a representation of the media data into first graphical symbol, said first graphical symbol is a folder as well,
- adding a single icon on a part of the first graphical symbol to signal direct insertion of the data into the folder of the first graphical symbol, said icon being selectable to display said representation of said data contained in the folder.

35. The computerized workstation of claim 34, wherein the processor is further arranged to:
- detect the user selecting the graphical symbol representing the element,
- provide a user reserved area on the display, and
- if detecting that the graphical symbol is being moved to the user reserved area, continuously transmit or order a device in the process control system to continuously transmit data relating to a functioning of the element in the process to a portable wireless communication device associated with the user for being presented on this device.

36. The computerized workstation according to claim 35, wherein the processor is further arranged to receive the data from the element or the device relating to the control of the element in the process.

37. The computerized workstation according to claim 35, wherein the processor is further arranged to receive data enabling identification of the user and selecting a user device based on a setting of user devices provided in a user setting store.

38. The computerized workstation according to claim 37, wherein the user identification enabling data is received through the user logging onto the workstation or wirelessly from an identification device carried by the user.

39. The computerized workstation of claim 34, wherein the symbols are provided on a screen area of the display that is larger than an area covered by the display, and
   wherein the processor is further arranged to:
      display a part of the screen area,
      detect a gesture performed by the user on the display, and
      change the part of the screen area displayed based on the detected gesture.

40. A computer program product on a non-transitory data carrier comprising computer program code configured to perform a method of providing a user with data relating to an element in a process being presented on a workstation display of a process control system, when the program code is loaded into a workstation provided in the process control system, the method comprising the steps of:
   providing a representation of the element on the display as a first graphical symbol,
   providing a second graphical symbol which indicates a certain type of data to be fetched by the workstation from the process,
   detecting a user selecting and moving the second graphical symbol to the first graphical symbol,
   fetching data from one of the element or a media recording device which provides the certain data type indicated by the second graphical symbol in response to the detection, the data being associated with the element and having the certain data type indicated by the second graphical symbol according to the detection, and
   providing an indication of the first graphical symbol by highlighting the first graphical symbol as the data is being received,
   directly inserting a representation of the media data into first graphical symbol, said first graphical symbol is a folder as well,
   adding a single icon on a part of the first graphical symbol to signal direct insertion of the data into the folder of the first graphical symbol, said icon being selectable to display said representation of said data contained in the folder.

41. The computer program product of claim 40, wherein the computer program code is further configured to:
   detect the user selecting the graphical symbol representing the element,
   provide a user reserved area on the display, and
   if detecting that the graphical symbol is being moved to the user reserved area, continuously transmit or order a device in the process control system to continuously transmit data relating to a functioning of the element in the process to a portable wireless communication device associated with the user for being presented on this device.

42. The computer program product of claim 40, wherein the computer program code is further configured to:
   display the symbols on a screen area that is larger than an area covered by the display,
   display a part of the screen area, detect a gesture performed by the user on the display, and
   change the part of the screen area displayed based on the detected gesture.

* * * * *